United States Patent
Oda et al.

(10) Patent No.: US 8,073,938 B2
(45) Date of Patent: Dec. 6, 2011

(54) INFORMATION PROCESSING APPARATUS AND METHOD OF OPERATING THE SAME

(75) Inventors: Takuya Oda, Yokohama (JP); Daisuke Iizuka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 118 days.

(21) Appl. No.: 12/393,142

(22) Filed: Feb. 26, 2009

(65) Prior Publication Data

US 2010/0131626 A1  May 27, 2010

(30) Foreign Application Priority Data

Nov. 25, 2008  (JP) ................................ 2008-299972

(51) Int. Cl.
G06F 15/16 (2006.01)
G06F 15/177 (2006.01)
(52) U.S. Cl. ......... 709/221; 709/245; 709/223; 709/224
(58) Field of Classification Search .......... 709/221–222, 709/223–226, 245
See application file for complete search history.

(56) References Cited

U.S. PATENT DOCUMENTS

| 5,537,591 | A | 7/1996 | Oka |
| 7,379,987 | B2 * | 5/2008 | Ishizaki et al. ............... 709/223 |
| 7,437,614 | B2 * | 10/2008 | Haswell et al. ............... 714/38 |
| 7,804,787 | B2 * | 9/2010 | Brandyburg et al. ......... 370/252 |

FOREIGN PATENT DOCUMENTS

JP  3177999  4/2001

OTHER PUBLICATIONS

Oka, Yoshiharu, Automatic Generation Device for System Constitution Diagram, Nov. 16, 1992, Japan Patent Application Publication 04326121 A (Japan Patent No. 3177999).*

* cited by examiner

*Primary Examiner* — Wing Chan
*Assistant Examiner* — Ruolei Zong
(74) *Attorney, Agent, or Firm* — Kilpatrick Townsend & Stockton LLP

(57) ABSTRACT

Using a service server list containing addresses of servers within a service system and an application list containing names of active applications within the service system, addresses of servers on which the active applications are running, and communication source addresses and communication destination addresses of the active applications, the following processes are carried out: specifying applications of a first layer in the service system from among applications lying within the service system; specifying applications of a second or subsequent layer in the service system from the application list and from addresses of servers on which the applications of the first layer are running; and judging applications having the same application name among applications belonging to the same layer as being of the same role for aggregation.

4 Claims, 27 Drawing Sheets

SERVICE EXECUTION SERVER LIST

| SERVICE EXECUTION SERVER ADDRESS |
|---|
| 192.168.2.1 |
| 192.168.2.2 |
| 192.168.2.3 |
| 192.168.2.4 |
| 192.168.2.5 |
| 192.168.2.6 |

FIG. 3

APPLICATION LIST 300

| APPLICATION IDENTIFIER 301 | SERVER ADDRESS 302 | APPLICATION NAME 303 | COMMUNICATION SOURCE ADDRESS 304 | COMMUNICATION DESTINATION ADDRESS 305 |
|---|---|---|---|---|
| APPLICATION #1 | 192.168.2.1 | APPLICATION A | 128.241.23.25 | 192.168.2.3 |
| APPLICATION #1 | 192.168.2.1 | APPLICATION A | 128.241.23.25 | 192.168.2.4 |
| APPLICATION #1 | 192.168.2.1 | APPLICATION A | 128.241.23.25 | 192.168.2.5 |
| APPLICATION #2 | 192.168.2.2 | APPLICATION A | 128.241.23.25 | 192.168.2.3 |
| APPLICATION #2 | 192.168.2.2 | APPLICATION A | 128.241.23.25 | 192.168.2.4 |
| APPLICATION #2 | 192.168.2.2 | APPLICATION A | 128.241.23.25 | 192.168.2.5 |
| APPLICATION #3 | 192.168.2.3 | APPLICATION B | 192.168.2.1 | 192.168.2.6 |
| APPLICATION #3 | 192.168.2.3 | APPLICATION B | 192.168.2.2 | 192.168.2.6 |
| APPLICATION #4 | 192.168.2.4 | APPLICATION C | 192.168.2.1 | 192.168.2.6 |
| APPLICATION #4 | 192.168.2.4 | APPLICATION C | 192.168.2.2 | 192.168.2.6 |
| APPLICATION #5 | 192.168.2.5 | APPLICATION C | 192.168.2.1 | 192.168.2.6 |
| APPLICATION #5 | 192.168.2.5 | APPLICATION C | 192.168.2.2 | 192.168.2.6 |
| APPLICATION #6 | 192.168.2.6 | APPLICATION D | 192.168.2.3 | - |
| APPLICATION #6 | 192.168.2.6 | APPLICATION D | 192.168.2.4 | - |
| APPLICATION #6 | 192.168.2.6 | APPLICATION D | 192.168.2.5 | - |

FIG. 4

APPLICATION ROLE CONFIGURATION LIST

| APPLICATION IDENTIFIER | LAYER IDENTIFIER | ROLE IDENTIFIER |
|---|---|---|
| APPLICATION #1 | LAYER #1 | ROLE #1 |
| APPLICATION #2 | LAYER #1 | ROLE #1 |
| APPLICATION #3 | LAYER #2 | ROLE #2 |
| APPLICATION #4 | LAYER #2 | ROLE #3 |
| APPLICATION #5 | LAYER #2 | ROLE #3 |
| APPLICATION #6 | LAYER #3 | ROLE #4 |

FIG. 5

AGGREGATED APPLICATION LIST

| ROLE IDENTIFIER | APPLICATION NAME | NUMBER OF APPLICATIONS |
|---|---|---|
| ROLE #1 | APPLICATION A | 2 |
| ROLE #2 | APPLICATION B | 1 |
| ROLE #3 | APPLICATION C | 2 |
| ROLE #4 | APPLICATION D | 1 |

FIG. 6

AGGREGATED APPLICATION COMMUNICATION LIST

| COMMUNICATION SOURCE ROLE IDENTIFIER | COMMUNICATION DESTINATION ROLE IDENTIFIER |
|---|---|
| ROLE #1 | ROLE #2 |
| ROLE #1 | ROLE #3 |
| ROLE #2 | ROLE #4 |
| ROLE #3 | ROLE #4 |

FIG. 7

SERVICE SYSTEM LIST

| APPLICATION IDENTIFIER | SERVICE SYSTEM NAME | ROLE IDENTIFIER |
|---|---|---|
| APPLICATION #1 | ORDER MANAGEMENT SYSTEM | ROLE #1 |
| APPLICATION #2 | CUSTOMER MANAGEMENT SYSTEM | ROLE #2 |
| APPLICATION #3 | ORDER MANAGEMENT SYSTEM | ROLE #3 |
| APPLICATION #3 | CUSTOMER MANAGEMENT SYSTEM | ROLE #4 |
| APPLICATION #4 | ORDER MANAGEMENT SYSTEM | ROLE #5 |
| APPLICATION #4 | CUSTOMER MANAGEMENT SYSTEM | ROLE #6 |
| APPLICATION #5 | ORDER MANAGEMENT SYSTEM | ROLE #5 |
| APPLICATION #5 | CUSTOMER MANAGEMENT SYSTEM | ROLE #6 |
| APPLICATION #6 | ORDER MANAGEMENT SYSTEM | ROLE #7 |
| APPLICATION #6 | CUSTOMER MANAGEMENT SYSTEM | ROLE #8 |

800 APPLICATION CONFIGURATION BASELINE

| APPLICATION IDENTIFIER | SERVER ADDRESS | APPLICATION NAME | COMMUNICATION SOURCE ADDRESS | COMMUNICATION DESTINATION ADDRESS |
|---|---|---|---|---|
| APPLICATION #1 | 192.168.2.1 | APPLICATION A | 128.241.23.25 | 192.168.2.4 |
| APPLICATION #2 | 192.168.2.2 | APPLICATION A | 128.241.23.25 | 192.168.2.4 |
| APPLICATION #4 | 192.168.2.4 | APPLICATION C | 192.168.2.1 | 192.168.2.7 |
| APPLICATION #4 | 192.168.2.4 | APPLICATION C | 192.168.2.2 | 192.168.2.7 |
| APPLICATION #7 | 192.168.2.7 | APPLICATION D | 192.168.2.4 | — |

900 APPLICATION CONFIGURATION CHANGE LIST

| APPLICATION IDENTIFIER | CONTENTS OF CHANGE |
|---|---|
| APPLICATION #3 | APPLICATION STARTUP |
| APPLICATION #5 | APPLICATION STARTUP |
| APPLICATION #6 | APPLICATION STARTUP |
| APPLICATION #7 | APPLICATION STOP |

1000 SETTING CHANGE APPLY LIST

| APPLICATION IDENTIFIER | CONTENTS OF SETTING |
|---|---|
| APPLICATION #1 | CHANGE SETTING ITEM Y1 OF SETTING FILE X1 TO Z1 |
| APPLICATION #2 | DELETE SETTING ITEM Y2 OF SETTING FILE X2 |

1001 / 1002

1200 PHYSICAL/LOGICAL(VIRTUAL) SERVER LIST

| PHYSICAL SERVER ADDRESS 1201 | LOGICAL(VIRTUAL) SERVER ADDRESS 1202 |
|---|---|
| 192.168.2.1 | |
| 192.168.2.2 | |
| 192.168.2.10 | 192.168.2.3 |
| 192.168.2.10 | 192.168.2.4 |
| 192.168.2.5 | |
| 192.168.2.6 | |

FIG. 12

1300 SHARED APPLICATION LIST

| ROLE IDENTIFIER 1301 | NUMBER OF SHARED APPLICATIONS 1302 | TYPE OF SHARING 1303 |
|---|---|---|
| ROLE #2 | 2 | PHYSICAL SERVER SHARING |
| ROLE #3 | 2 | PHYSICAL SERVER SHARING |
| ROLE #4 | 1 | PLURAL BUSINESS SYSTEMS SHARING |

FIG. 13

INFORMATION PROCESSING APPARATUS AND METHOD OF OPERATING THE SAME

CROSS-REFERENCE TO RELATED APPLICATIONS

The present application claims a priority from Japanese Patent Application No. 2008-299972 filed on Nov. 25, 2008, the content of which herein incorporated by reference.

BACKGROUND OF THE INVENTION

1. Field of the Invention

The present invention relates generally to an information processing apparatus and a method of operating the same, and, more particularly, to an information processing apparatus and a method of operating the information processing apparatus, capable of easily and simply grasping the configuration of active applications in an environment where a plurality of applications are running on a plurality of servers.

2. Description of the Related Art

To effectively manage operations of an IT-based service system, it is commonly necessary to correctly grasp the current system configuration. On the other hand, recent service system is getting larger and larger due to introduction of system linkage technique, server virtualization technique, etc. When such a large-scale service system is to be managed, a difficulty may occur to the system administrator to correctly manage the current configuration of the service system. Because of such a difficulty, the system administrator may experience delay in recognizing or may fail to recognize any failure or configurational change of the service system, which may result in enormous damage to the service.

A prior art of Japanese Patent No. 3177999 specification is an example of a method of automatically displaying the configuration information of a service system. Japanese Patent No. 3177999 specification discloses a method of automatically creating a system configuration diagram based on definition information describing the contents of a plurality of processes making up the system.

In accordance with the technique described in the above patent document, the system configuration diagram is automatically created by an output means that displays or prints out names of a plurality of groups obtained by classifying a service system. A specific procedure to automatically create the system configuration diagram is carried out by a means that, through the entry of the system administrator, stores a series of processes of the service system for featuring the groups classified when putting together the service system (e.g., the content of a process is whether the record is to be written when the definition element is a file), a means that analyzes processes of the service system to be classified and compares the results with a series of prestored processes to judge to which group the service system belongs, and the output means that displays or prints out the name of the classified group.

The method of the above patent document necessitates a processing unit that stores a series of processes of the service system for featuring the classified groups and requests the system administrator to enter the series of processes of the service system stored by the processing unit. The system administrator enters know-hows of the processes within the service system. Thus, to deal with a new process, maintenance of the know-hows is needed. If old know-hows are used intactly without any maintenance, the processes beyond the know-hows cannot be dealt with. Therefore, the service system executing such the processes cannot create correct service system configuration diagrams. This means that the system administrator cannot grasp the correct configuration of the current service system.

When displaying definition elements on a display screen of a management computer, if a multiplicity of service systems are to be administered, the definition elements cannot lie on a single screen because their display are not aggregated. This may render it difficult to grasp at a glance how many service systems exist.

SUMMARY OF THE INVENTION

It is therefore the object of the present invention to enable the configuration of active applications to easily and simply be grasped in an environment where a plurality of applications is running on a plurality of servers.

In order to achieve the above and other objects, one aspect of the present invention provides an information processing apparatus communicatively coupled via a network to servers on which a plurality of applications are running for operating a service system, the information processing apparatus comprising a storage unit that stores network addresses of the servers, storing, in a correlated manner, application identification information as information for identifying the applications, active server addresses as network addresses of the servers on which the applications are running, and communication source addresses of the applications; and an application aggregating unit acquiring from the storage unit and comparing the application identification information, the addresses of the servers corresponding thereto, and communication source addresses of the applications, so that when it is judged that the communication source addresses do not coincide with any of the addresses of the servers, the application aggregating unit judges the applications having the application identification information as being applications belonging to a first layer in the service system, acquiring from the storage unit and comparing application identification information of the applications judged as belonging to the first layer, the active server addresses of the applications, and the application identification information and communication source addresses of applications other than the applications judged as belonging to the first layer, so that the application aggregating unit judges applications having the application identification information correlated to the communication source addresses identical to the active server addresses as belonging to a second layer; and continuing acquiring from the storage unit communication source addresses of applications other than the applications judged as belonging to the first and the second layer, to repeat the judgment process to judge the layers of each applications contained in the service system.

The other problems and solutions thereof disclosed herein will become apparent when reading the detailed description of the invention while referring to the accompanying drawings.

According to the present invention, the configuration of active applications can be easily and simply grasped in the environment where a plurality of applications is active in a plurality of servers.

BRIEF DESCRIPTION OF THE DRAWINGS

FIG. 3 depicts an example of a service execution server list;

FIG. 4 depicts an example of an application list;

FIG. 5 depicts an example of an application role configuration list;

FIG. 6 depicts an example of an aggregated application list;

FIG. 7 depicts an example of an aggregated application communication list;

FIG. 8 depicts an example of a service system list;

FIG. 9 depicts an example of an application configuration baseline;

FIG. 10 depicts an example of an application configuration change list;

FIG. 11 depicts an example of a setting change apply list;

FIG. 12 depicts an example of a physical/logical(virtual) server list;

FIG. 13 depicts an example of a shared application list;

DETAILED DESCRIPTION OF THE INVENTION

Exemplary embodiments of the present invention will now be described with reference to the accompanying drawings.

First Embodiment

Figure 1:
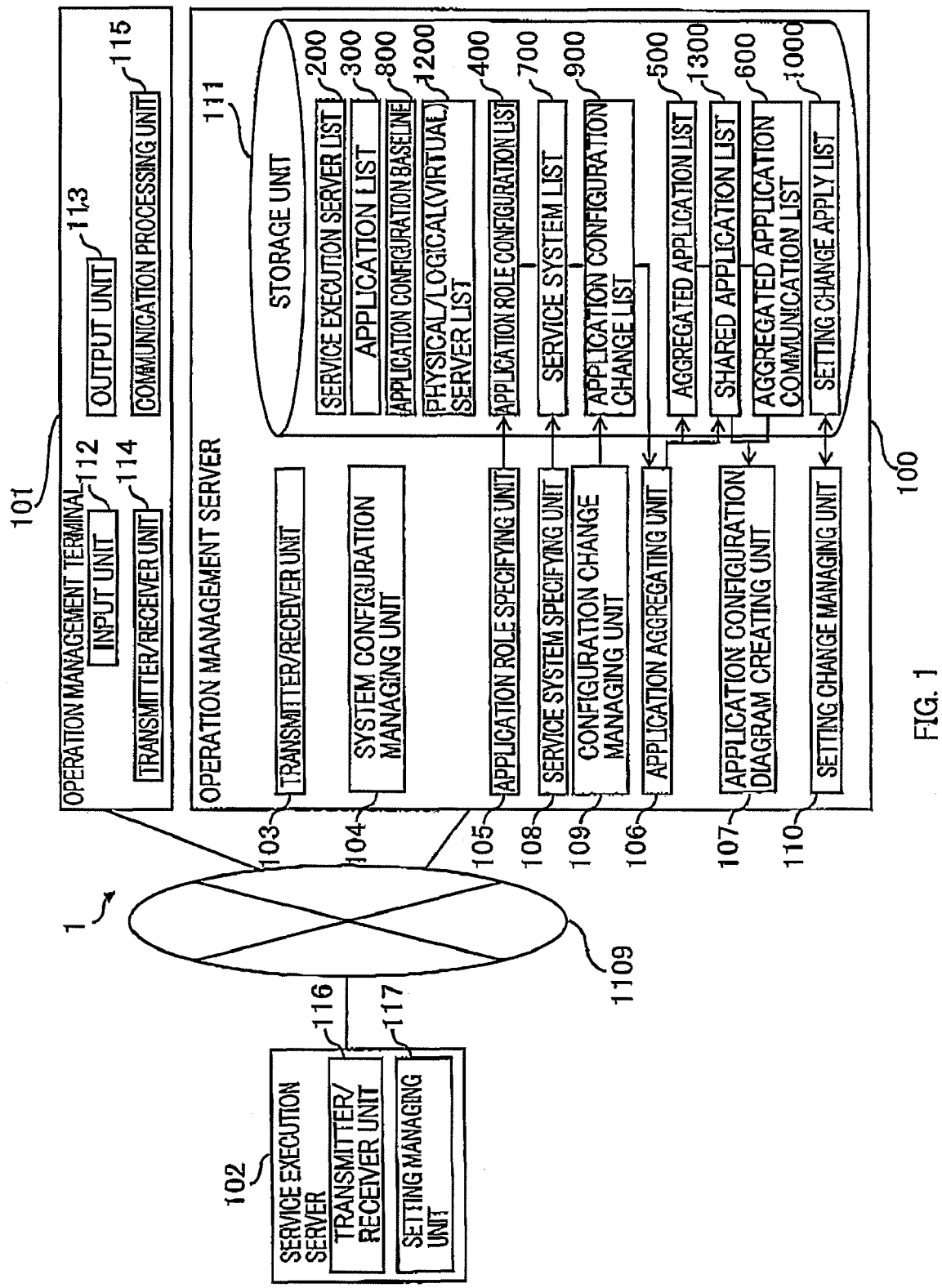
FIG. 1 is a block diagram of an exemplary configuration of the information processing system 1.
Figure 2:
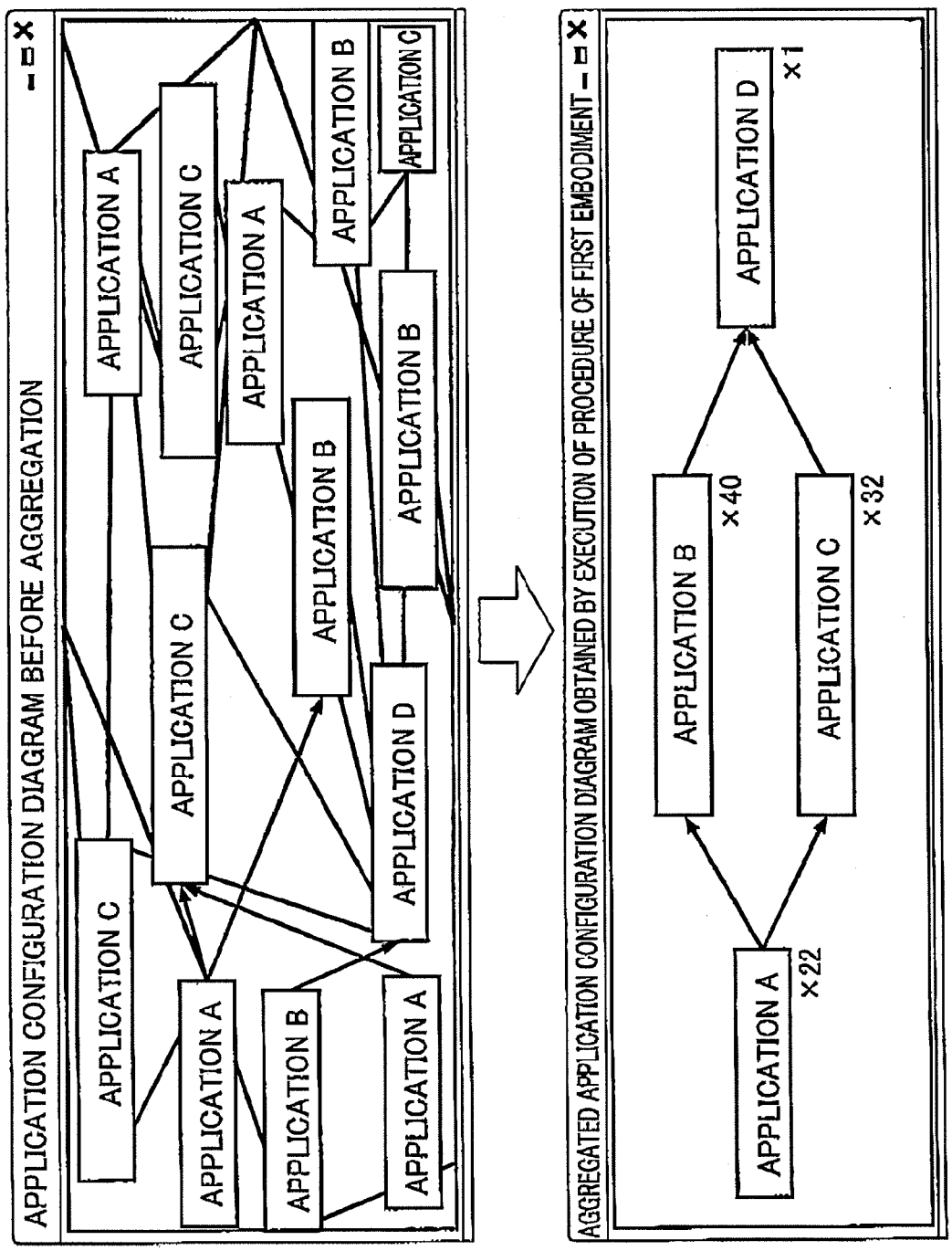
FIG. 2 depicts, by way of example, a configuration diagram of applications before aggregation and a configuration diagram of applications aggregated by a first embodiment of the present invention.

FIG. 1 is a block diagram of the configuration of an information processing system 1 according to a first embodiment of the present invention. FIG. 2 depicts, by way of example, a configuration diagram applications before aggregation and a configuration diagram of applications aggregated and displayed by the first embodiment.

The information processing system 1 of the first embodiment includes an operation management server 100, an operation management terminal 11, and a service execution server 102, which are communicatively coupled to one another by way of a network 1109. Although the details will be described later, the operation management server 100, the operation management terminal 101, and the service execution server 102 are computers each having a typical hardware configuration, provided with a CPU, memories (RAM, ROM, etc.), a data I/O interface, a communication interface (NIC, etc.), an auxiliary storage device (disk device, etc.) storing software programs, entry devices such as a keyboard and a mouse, a display device, and an output device such as a printer.

Functional blocks (e.g., an application aggregating unit 106 of the operation management server 100) assigned to the operation management server 100, the operation management terminal 101, and the service execution server 102 are implemented by the CPU reading in a memory and executing a software program for that function which is stored in the auxiliary storage device.

The operation management server 100 will first be described. The operation management server 100 is a server computer that executes a procedure to aggregate and display applications running in the service execution server 102 which will be described later. The operation management server 100 includes a transmitter/receiver unit 103, a system configuration managing unit 104, an application role specifying unit 105, the application aggregating unit 106, an application configuration diagram creating unit 107, a service system specifying unit 108, a configuration change managing unit 109, a settings change managing unit 110, and a storage unit 111.

The transmitter/receiver unit 103 executes a communication process for the operation management server 100. The transmitter/receiver unit 103 allocates information received via the network 1109 from the operation management terminal 101 or the service execution server 102 to the processing units of the operation management server 100 which are specified by the received information. The transmitter/receiver unit 103 sends out via the network 1109 information to be sent to the operation management terminal 101 and the service execution server 102 by the processing units of the operation management server 100.

The system configuration managing unit 104 stores, depending on the input data type, input data received from the operation management terminal 101 into a service execution server list 200, an application list 300, or an application configuration baseline 800 which are stored in the storage unit 111, which will be described later.

The application role specifying unit 105 specifies, for an application running in a computer to be managed by the operation management server 100, a role of the application in a service system. The object of management is a computer whose operation is to be managed by the operation management server 100. In this embodiment, it is the service execution server 102.

As used herein, the term "role of the application" represents each of groups classified by names of applications for each of application layers which will be described later. As used herein, the term "application layer" means "the communication order of applications in the service system communicated from the exterior of the service system". That is, an application firstly communicated from the exterior of the service system is an application of a layer 1 (a first layer); an application communicated from the application of the layer 1 is an application of a layer 2; and an application communicated from the application of the layer 2 is an application of a layer 3.

The application role specifying unit 105 manages an application role configuration list 400 which will be described later. Upon receiving a message requiring to specify an application role, the application role specifying unit 105 reads the service execution server list 200 and the application list 300 from the storage unit 111 to specify an application role for storage in the application role configuration list 400 of the storage unit 111.

The application aggregating unit 106 specifies the role of each of applications to store information on groups which will be described later into the application role configuration list 400 and an aggregated application list 500 which will be described later. The applications are classified into a single group or a plurality of groups of each role based on information on those applications. In the first embodiment, the applications are grouped based on the role and the name of those applications.

The application aggregating unit 106 reads the application role configuration list 400 from the storage unit 111 to count the number of applications having the same role for storage in the aggregated application list 500 of the storage unit 111.

In a second and a third embodiments which will be described later, the application aggregating unit 106 reads a service system list 700 or an application configuration change list 900, in addition to the application list 300 and the application role configuration list 400, from the storage unit 111, to specify the roles of the applications.

The application aggregating unit 106 reads the application list 300, the application role configuration list 400, and the aggregated application list 500 from the storage unit 111, to specify a role as a communication source and a role as a communication destination for each of the roles, for storage in an aggregated application communication list 600, which will be described later, of the storage unit 111.

The application configuration diagram creating unit 107 reads the aggregated application list 500 and the aggregated application communication list 600 from the storage unit 111 to create an application configuration diagram. FIG. 2 depicts examples of application configuration diagrams before and after aggregation according to the first embodiment. As shown in the aggregated application configuration diagram, the application configuration diagram creating unit 107 creates data for grouping applications by roles for display on a single screen so as not to exceed the size of video data making up one screen of a monitor screen provided on the operation management server 100.

The service system specifying unit 108 reads the application role configuration list 400 and the application list 300 for connection of a role 1 application to Web to store a title displayed as a result thereof in the service system list 700.

The configuration change managing unit 109 reads the application list 300 and the application configuration baseline 800, which will be described later, from the storage unit 111 to specify contents of the change from the application configuration baseline 800 for storage in the application configuration change list 900, which will be described later.

Upon receiving a setting change request from the operation management terminal 101, the setting change managing unit 110 reads the application list 300 and the application role configuration list 400 from the storage unit 111 to specify an application whose setting is to be changed and a server in which that application is active, for transmission of the setting contents to that server.

The storage unit 111 is a storage that stores information required to implement an operation management procedure by the operation management server 100.

The storage unit 111 stores the service execution server list 200, the application list 300, the application role configuration list 400, the aggregated application list 500, the aggregated application communication list 600, the service system list 700, the application configuration baseline 800, the application configuration change list 900, a setting change apply list 1000, a physical/logical(virtual) server list 1200, and a shared application list 1300.

The service execution server list 200 is table-format data and stores addresses of servers such as the service execution server 102 to be managed by the operation management server 100. The "address" is an identifier allowing a server to be uniquely specified.

FIG. 3 depicts an example of a service execution server list 200. The service execution server list 200 stores in rows addresses of servers to be managed by the operation management server 100. The service execution server list 200 has a service execution server address column 201. The service execution server address column 201 stores addresses allowing unique specification of servers to be managed by the operation management server 100.

Through the operation management terminal 101, the system administrator enters information shown in the service execution server list 200 so that the system configuration managing unit 104 stores the entered information into the service execution server list 200 of the storage unit 111. The system configuration managing unit 104 may store in the service execution server list 200 results of address lists of the service servers which are collected using separate tools or utilities and received from the transmitter/receiver unit 103.

The application list 300 is table-format data and it stores information of applications running on servers such as the service execution server 102 to be managed by the operation management server 100. FIG. 4 depicts an example of the application list 300. The application list 300 stores in rows information of applications. The application list 300 has an application identifier column 301, a server address column 302, an application name column 303, a communication source address column 304, and a communication destination address column 305. The application identifier column 301 stores application identifiers as identification information uniquely specifying applications. The server address column 302 stores addresses specifying servers having active applications, by which addresses correlations are made with the service execution servers 102 specified by the service execution server address column 201. The application name column 303 stores names (e.g., product names) of applications. The communication source address column 304 stores addresses of servers on which active applications are sending communications to respective applications. The communication destination address column 305 stores addresses of servers on which active applications are receiving communications from applications.

Through the operation management terminal 101, the system administrator enters information shown in the application list 300 so that the system configuration managing unit 104 stores the entered information in the application list 300 of the storage unit 111. The system configuration managing unit 104 may store in the application list 300 information of applications running on the service system which are collected using separate tools or utilities and received from the transmitter/receiver unit 103.

The application role configuration list 400 is table-format data and it has information on roles of applications in the service system stored in the application list 300. FIG. 5 depicts an example of the application role configuration list 400. The application role configuration list 400 stores information specifying the roles of applications in respective rows. The application role configuration list 400 has an application identifier column 401, a layer identifier column 402, and a role identifier column 403. The application identifier column 401 stores application identifiers as identification information specifying applications, by which identification information correlations are made with the application information specified by the application identifier column 301 of the application list 300. The layer identifier column 402 stores identifier information specifying the layers of applications specified by the application role specifying unit 105. The role identifier column 403 stores identifier information specifying the roles of applications specified by the application role specifying unit 105.

The application role specifying unit 105 stores in the application role configuration list 400 the layers and the roles of applications specified based on the contents of the service execution server list 200 and the application list 300. The application aggregating unit 106 stores the identifiers specifying the layers and the roles of applications in the application role configuration list 400, based on the contents of the application list 300 and the application role configuration list 400.

The aggregated application list 500 is table-format data and it stores information on roles of applications classified by the application aggregating unit 106. FIG. 6 depicts an example of the aggregated application list 500. The aggregated application list 500 stores information on the roles of applications in respective columns. The aggregated application list 500 has a role identifier column 501, an application name column 502, and a within-role number-of-applications column 503.

The role identifier column 501 stores identification information specifying roles of applications, by which identifier information correlations are made with role information of applications specified by the role identifier column 403. The application name column 502 stores the names of applications within roles. The within-role number-of-applications column 503 stores the number of applications falling within each of the roles.

The application aggregating unit 106 stores the role information of each of applications into the aggregated application list 500, based on the contents of the application list 300 and the application role configuration list 400. The application aggregating unit 106 stores the role information on each of applications into the aggregated application list 500, based on the contents of the application list 300 and the application role configuration list 400 as well as the contents of the service system list 700 and/or the application configuration change list 900, which will both be described later. The number of applications falling within each of roles counted by the application aggregating unit 106 is stored in the aggregated application list 500.

The aggregated application communication list 600 is table-format data and it stores role-to-role communication information. FIG. 7 depicts an example of the aggregated application communication list 600. The aggregated application communication list 600 stores information on communications between roles in respective rows. The aggregated application communication list 600 has a communication source role identifier column 601 and a communication destination role identifier column 602. The communication source role identifier column 601 stores identification information specifying the role of an information sending party in a communication. By this identifier information, correlations are made with the role information of applications specified by the role identifier column 501 of the aggregated application list 500. The communication destination role identifier column 602 stores identification information specifying the role of an information receiving party in the communication. By this identifier information, correlations are made with role information of applications specified by the role identifier column 501 of the aggregated application list 500.

The application aggregating unit 106 stores the role-to-role communication information specified based on the application list 300 and the application role configuration list 400 into the aggregated application communication list 600.

The service system list 700 is table-format data and it stores information on service systems and correlations between the service systems and applications used therein. The service systems are systems executing service processes required to operate a company such as sales, production, accounting, and physical distribution, and exemplified typically by a financial management system, a pay management system, an online purchase system, and a service management system. FIG. 8 depicts an example of the service system list 700.

The service system list 700 stores information on service systems and correlations between the service systems and applications used therein in respective rows. The service system list 700 has an application identifier column 701, a service system name column 702, and a role identifier column 703. The application identifier column 701 stores application identifiers as identification information specifying applications. This identifier information allows correlations with information of applications specified by the application identifier column 301 of the application list 300. The service system name column 702 stores names of service systems (e.g., the financial management system). The role identifier column 703 stores identification information specifying roles of applications. This identifier information allows correlations with role information of applications specified by the role identifier column 403 of the application role configuration list 400 and by the role identifier column 501 of the aggregated application list 500.

The service system specifying unit 108 stores in the service system list 700 the information on service systems to which belong applications specified based on the contents described in the application list 300 and the application role configuration list 400.

The application configuration baseline 800 is table-format data and it stores the information of applications which are to be active on servers such as the service execution servers 102 to be managed by the operation management server 100. The application configuration baseline 800 is used when compared with the current application configuration. FIG. 9 depicts an example of the application configuration baseline 800.

The application configuration baseline 800 stores information of applications in respective rows. The application configuration baseline 800 has an application identifier column 801, a server address column 802, an application name column 803, a communication source address column 804, and a communication destination address column 805. The application identifier column 801 stores application identifiers as identification information specifying applications. This identifier information allows correlations with information of applications specified by the application identifier column 301 of the application list 300. The server address column 802 stores addresses specifying servers having active applications thereon, by which addresses correlations are made with service servers specified by the service execution server address column 201 of the service execution server list 200. The application name column 803 stores names of applications. The communication source address column 804 stores addresses of servers on which active applications are sending communications to applications. The communication destination address column 805 stores addresses of servers on which active applications are receiving communications from the applications.

By way of the operation management terminal 101, the system administrator enters information indicated in the application configuration baseline 800 so that the system configuration managing unit 104 stores the entered information into the application configuration baseline 800 of the storage unit 111. The system configuration managing unit 104 may store in the application configuration baseline 800 information of applications running on the service systems which are collected using separate tools or utilities and received from the transmitter/receiver unit 103. The system configuration managing unit 104 may read the contents of the application list 300 and store the read contents into the application configuration baseline 800.

The application configuration change list 900 is table-format data and it stores information on change of configurations of applications from the application configuration baseline 800. FIG. 10 depicts an example of the application configuration change list 900. The application configuration change list 900 stores configuration change information of applications in respective rows. The application configuration change list 900 has an application identifier column 901 and a contents-of-change column 902.

The application identifier column 901 stores therein application identifiers as identification information specifying applications. By this identifier information, correlations are made with information of applications specified by the application identifier column 301 of the application list 300 and by the application identifier column 801 of the application configuration baseline 800. The contents-of-change column 902 stores the contents of change in configuration of applications. As used herein, the content of change in configuration of applications refers to information of changes applied to applications making up service systems, and includes events such as startup of an application, stop of an application, finding of a new communication destination, finding of a new communication source, interruption of communication with communication source, and interruption of communication with communication destination.

The configuration change managing unit 109 stores change information of applications into the application configuration change list 900, based on the contents of the application list 300 and the application configuration baseline 800. The transmitter/receiver unit 103 may receive, e.g., changes of contents of setting files of applications described in the application list 300 or the application configuration baseline 800, which are detected using separate tools or utilities. The configuration change managing unit 109 may then store the received contents into the application configuration change list 900.

The setting change apply list 1000 is table-format data and it stores information of changes for setting information of applications running on servers such as the service execution servers 102. FIG. 11 depicts an example of the setting change apply list 1000. The setting change apply list 1000 stores information that changes setting information of applications in respective rows. The setting change apply list 1000 has an application identifier column 1001 and a contents-of-setting column 1002.

The application identifier column 1001 stores application identifiers as identification information specifying applications. This identifier information allows correlations with information of applications specified by the application identifier column 301 of the application list 300. The contents-of-setting column 1002 stores the contents of change of the setting information of applications.

As used herein, the content of change of the setting information of applications refers to the content of change applied to the setting information of applications running on servers such as service execution servers 102, and includes change of parameters described in a specific setting file or memory, deletion of parameters described in the specific setting file or memory, addition of parameters to a setting file or memory, and the like.

Through the operation management terminal 101, the system administrator enters information indicated in the setting change apply list 1000 so that the setting change managing unit 110 stores the entered information into the setting change apply list 1000 of the storage unit 111. Through the operation management terminal 101, the system administer may also enter identification information specifying a specific single or a plurality of roles and the contents of setting of the roles, so that from the entered role specifying identifier information the setting change managing unit 110 may specify application identifiers belonging to the role while referring to the application role configuration list 400, and store the specified application identifiers together with the contents of setting of the role into the setting change apply list 1000 of the storage unit 111. By entering information indicated in the setting change apply list 1000 through separate utilities or tools, the setting change managing unit 110 may store the entered information into the setting change apply list 1000 of the storage unit 111.

The physical/logical(virtual) server list 1200 is table-format data and it stores information on types of servers to be managed such as the service execution servers 102 that the operation management server 100 manages. FIG. 12 depicts an example of the physical/logical(virtual) server list 1200. The physical/logical(virtual) server list 1200 stores information on types of servers in respective rows.

The physical/logical(virtual) server list 1200 has a physical server address column 1201 and a logical(virtual) server address column 1202. The physical server address column 1201 stores addresses of physical servers to be managed. The physical server address column 1201 stores addresses of physical servers on which logical(virtual) servers described in the logical(virtual) server address column 1202 are running. By this address information, correlations are made with information of applications specified in the server address column 302 of the application list 300.

The logical(virtual) server address column 1202 stores addresses of logical(virtual) servers to be managed. The logical(virtual) server address column 1202 stores addresses of logical(virtual) servers running on the physical servers described in the physical server address column 1201. By this address information, correlations are made with server address information of the service execution server list 200 and the application list 300.

Through the operation management terminal 101, the system administrator enters information indicated in the physical/logical(virtual) server list 1200 so that the system configuration managing unit 104 stores the entered information into the physical/logical(virtual) server list 1200. By entering information indicated in the physical/logical(virtual) server list 1200 through separate utilities or tools, the system configuration managing unit 104 may store the entered information into the physical/logical(virtual) server list 1200 of the storage unit 111.

The shared application list 1300 is table-format data and it stores information on whether applications running on servers such as the service execution servers 102 to be managed by the operation management server 100 are shared by a plurality of service systems and whether physical servers having the running virtual servers thereon are shared in case of applications running on the virtual servers. FIG. 13 depicts an example of the shared application list 1300. The shared application list 1300 stores, in respective rows, information on whether those applications are shared by a plurality of service systems and whether physical servers having the running virtual servers thereon are shared in case of applications running on the virtual servers.

The shared application list 1300 has a role identifier column 1301, a number-of-shared-applications column 1302, and a type-of-sharing column 1303. The role identifier column 1301 stores identification information for specifying roles of applications. This identification information allows correlations with role information of applications specified in the role identifier column 403 of the application role configuration list 400, with role information of applications specified in the role identifier column 501 of the aggregated application list 500, and with information on service systems and applications specified in the role identifier column 703 of the service system list 700.

The number-of-shared-applications column 1302 stores the number of applications shared by a plurality of service systems or the number of applications running on virtual servers that work on the same physical server. The type-of-sharing column 1303 stores the type of sharing of applications, as well as the information specifying whether the applications are ones shared by a plurality of service systems or whether the applications are ones running on virtual servers that work on the same physical server.

The application aggregating unit 106 counts the number of applications belonging also to other roles for each role, based on the contents described in the service system list 700, and stores the number together with the type of sharing into the shared application list 1300 of the storage unit 111. The application aggregating unit 106 counts the number of applications running on virtual servers that work on the same physical server for each role, based on the contents described in the physical/logical(virtual) server list 1200, the application list 300, and the service system list 700, and stores the number together with the type of sharing into the shared application list 1300 of the storage unit 111. Through the operation management terminal 101, the system administrator may also enter the information indicated in the shared application list 1300 so that the system configuration managing unit 104 may store the entered information into the shared application list 1300 of the storage unit 111. By entering information indicated in the shared application list 1300 through separate utilities or tools, the system configuration managing unit 104 may store the entered information into the shared application list 1300 of the storage unit 111.

Figure 14:
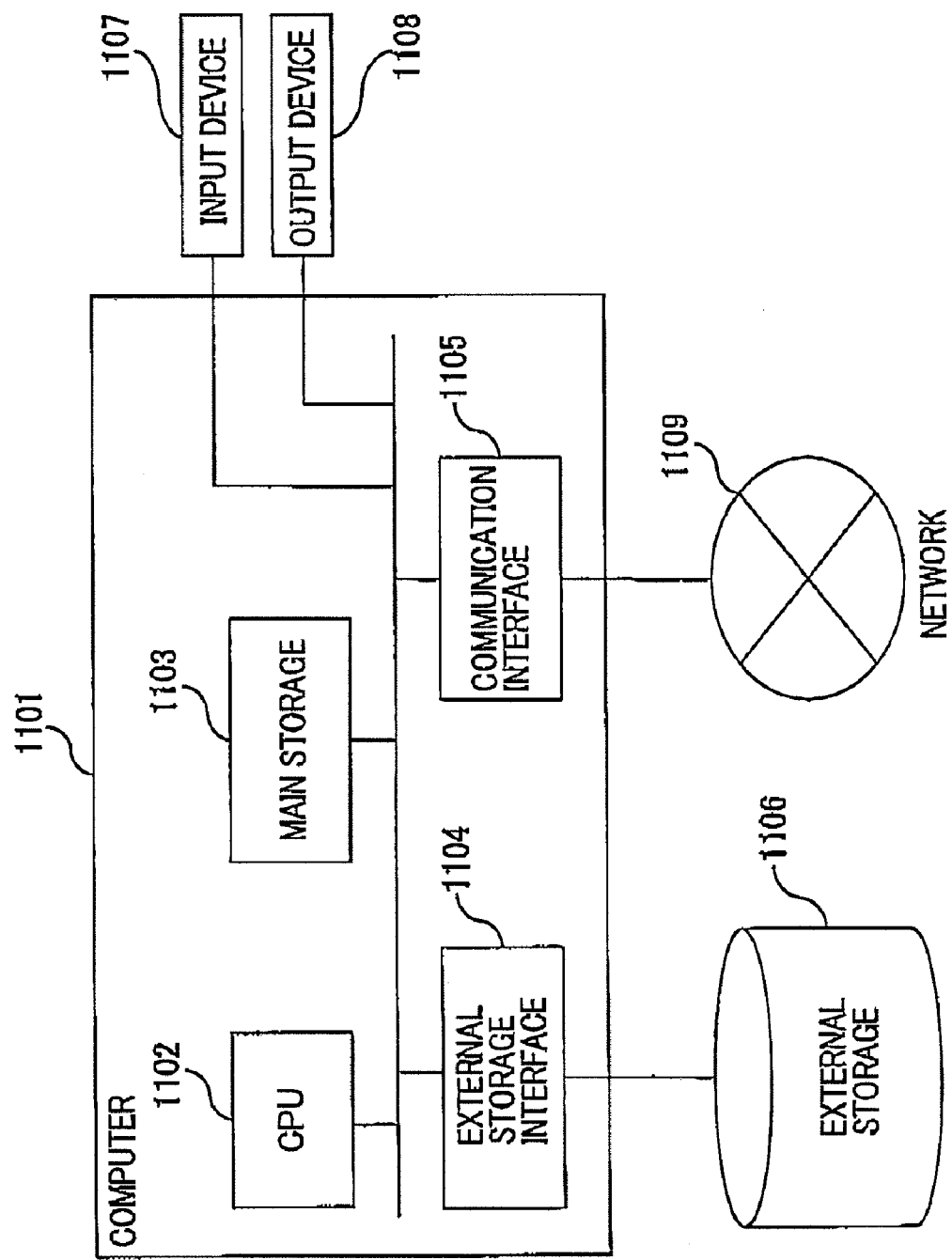
FIG. 14 is an exemplary hardware configuration diagram of a server such as an operation management computer.

The operation management server 100 runs on a server machine 1101 having a hardware configuration shown in FIG. 14. The server machine 1101 includes a CPU 1102, a main storage 1103 (RAM, ROM, etc.), an external storage interface 1104, a communication interface 1105 (NIC, etc.), an external storage 1106 (disk device, etc.) storing programs, etc., an input device 1107 such as a keyboard and a mouse, and an output device 1108 such as a display device and a printer.

The transmitter/receiver unit 103, the system configuration managing unit 104, the application role specifying unit 105, the application aggregating unit 106, the application configuration diagram creating unit 107, the service system specifying unit 108, the configuration change managing unit 109, and the setting change managing unit 110 are functional blocks implemented by the CPU 1102 executing programs stored in the external storage 1106 and read into the main storage 1103 via the external storage interface 1104. The transmitter/receiver unit 103 may also be implemented by the communication interface 1105 and a communication control program controlling the communication interface 1105. The storage unit 111 is implemented by the main storage 1103 and/or the external storage 1106.

Hardware configurations of the operation management terminal 101 and of the service execution server 102 are similar to the configuration of the server machine 1101 shown in FIG. 14 despite possible differences in their scales and performances.

Though the operation management server 100, the operation management terminal 101, and the service execution server 102 are represented as separate servers in FIG. 1, those servers may each be composed of a plurality of servers or may be integrated into a single server. The operation management server 100 is not limited to a physical server. Namely, it may be a virtual server or may be a logical server defined by cluster configuration, etc.

Referring back to FIG. 1, the operation management terminal 101 will be described. The operation management terminal 101 is a server that controls processes of data input to and data output from the operation management server 100. Through the operation management terminal 101, the system administrator sends to the operation management server 100 a request message to store the service execution server list 200, the application list 300, the application configuration baseline 800, and the setting change apply list 1000. Through the operation management terminal 101, the system administrator also sends a request message to create an application configuration diagram to the operation management server 100.

Further, through the operation management terminal 101, the system administrator sends to the operation management server 100 a request message to specify a service system for an application described in the application list 300. Through the operation management terminal 101, the system administrator also sends to the operation management server 100 a request message to compare an application described in the application list 300 with another application described in the application configuration baseline 800 to specify the contents of change of the application configuration.

Further yet, through the operation management terminal 101, the system administrator sends to the operation management server 100 a request message to change setting information on an application running on a server such as the service execution server 102. Through the operation management terminal 101, the system administrator also sends to the operation management server 100 a request message to create an application configuration diagram from information on an aggregated application described in the aggregated application list 500 and the aggregated application communication list 600.

The operation management terminal 101 has an input unit 112, an output unit 113, a transmitter/receiver unit 114, and a communication processing unit 115. The input unit 112 accepts input of information on the various request messages entered by the system administrator, whereas the output unit 113 outputs the information to the system administrator.

The transmitter/receiver unit 114 is a processing unit that executes a transmission/reception process including transmission of information received from the processing units such as the communication processing unit 115 of the operation management terminal 101 to the network 1109 and transmission of information received from the network 1109 to the processing units.

The communication processing unit 115 executes a communication process with the operation management server 100.

The operation management terminal 101 works on the server machine 1101 having the hardware configuration of FIG. 14.

The communication processing unit 115 can be implemented by the CPU 1102 executing a program on the external storage 1106 read into the main storage 1103.

The transmitter/receiver unit 114 can be implemented by the communication interface 1105.

The input unit 112 can be implemented by the input device 1107. The input device 1107 is for example a pointing device such as a mouse and/or a keyboard.

The output unit 113 can be implemented by the output device 1108. The output device is for example a monitor and/or a printer.

The service execution server 102 is a server on which are working service systems to be managed by the operation management server 100. The service execution server 102 and the service system may not necessarily have a one-to-one correspondence. That is, a single service system may work on the service execution server 102, or alternatively the service system may work for each of virtual servers running on the service execution server 102. Instead, the service system may also be made up of a plurality of service execution servers 102. The service execution server 102 is not limited to a physical server. That is, it may be a virtual server or may be a logical server defined by a cluster configuration etc.

The service execution server 102 includes a transmitter/receiver unit 116 and a setting managing unit 117. The transmitter/receiver unit 116 executes a process of communication between the setting managing unit 117 and the operation management server 100 or the operation management terminal 101. The setting managing unit 117 executes processes of setting or changing of setting information on the service execution server 102.

The operation management terminal 101 works on the server machine 1101 having the hardware configuration of FIG. 14.

The transmitter/receiver unit 116 and the setting managing unit 117 can be implemented by the CPU 1102 executing programs on the external storage 1106 read into the main storage 1103.

The transmitter/receiver unit 116 may be implemented by the communication interface 1105.

Figure 15:
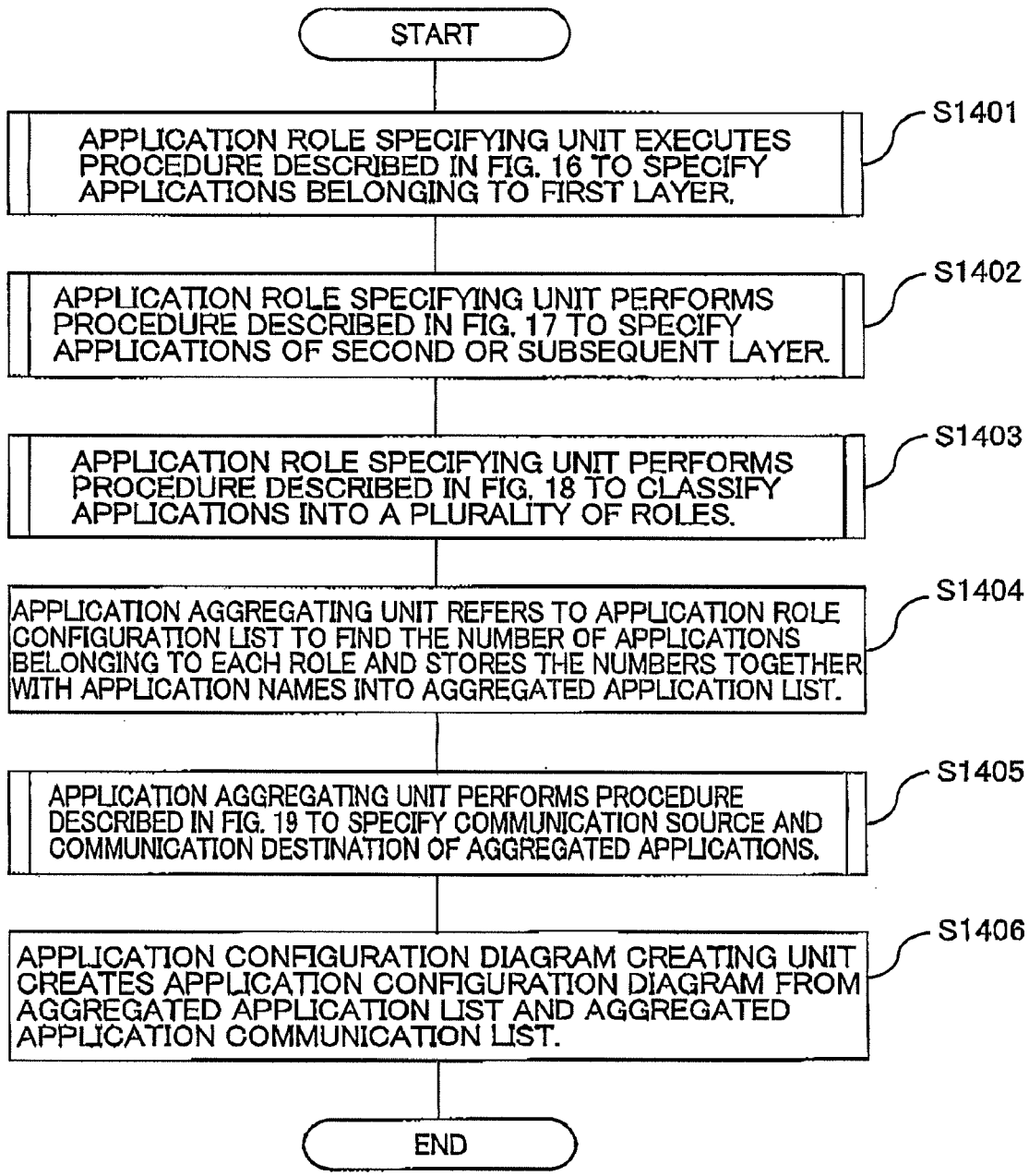
FIG. 15 is an exemplary flowchart of a general procedure effected by the information processing system according to the first embodiment.

Description will hereinafter be made of an application aggregated display process implemented by this embodiment of the present invention. FIG. 15 is an exemplary flowchart of a general procedure effected by the information processing system 1 of this embodiment.

Process steps S1401, S1402, S1403, and S1405 included in the flow of FIG. 15 will be detailed referring to FIGS. 16 to 19, respectively.

First, the application role specifying unit 105 specifies applications belonging to a first layer and stores information of the applications into the application role configuration list 400 (step 1401).

Figure 16:
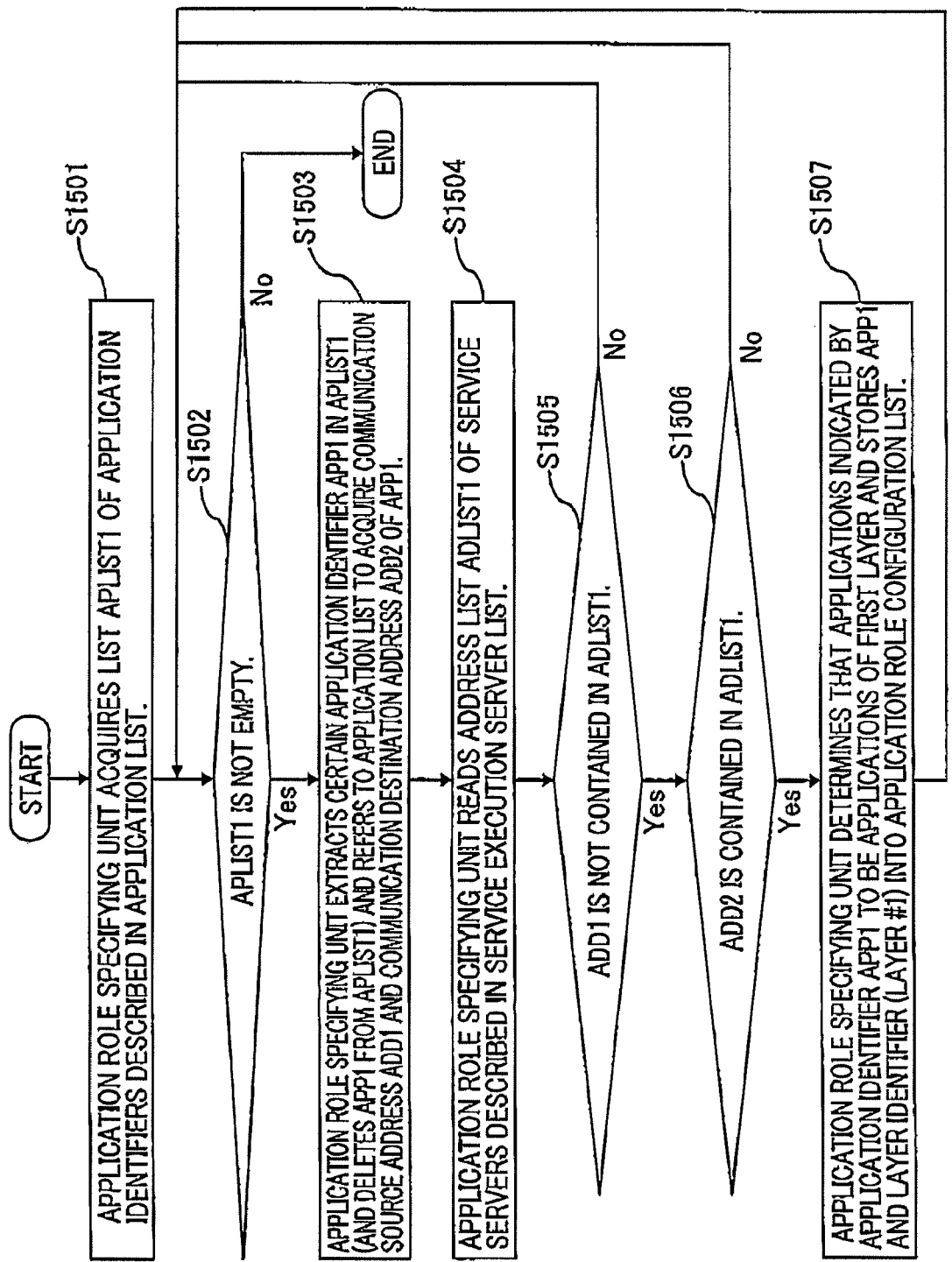
FIG. 16 is an exemplary flowchart of a procedure for specifying applications of a first layer according to the first embodiment.

Specifically, the procedure of FIG. 16 is carried out. The application role specifying unit 105 acquires all of application identifiers described in the application list 300 to create an application identifier list ApList1 of all the application identifiers acquired (step 1501).

The application role specifying unit 105 judges whether the list ApList1 is not empty (step 1502). If negative, i.e., the list ApList1 is empty (No at step 1502), then the procedure comes to an end. If affirmative, i.e., the list ApList1 is not empty (Yes at step 1502), then the application role specifying unit 105 executes processes from step 1503 onward.

The application role specifying unit 105 extracts an arbitrary application identifier App1 described in the list ApList1 and deletes the application identifier App1 from the list ApList1 so as to acquire a communication source address Add1 and a communication destination address Add2 of an application corresponding to the application identifier App1 from the application list 300 (step 1503).

The application role specifying unit 105 acquires an address list AdList1 of service servers described in the service execution server list 200 (step 1504).

The application role specifying unit 105 judges whether the communication source address Add1 is not contained in the service execution server address list AdList1 (step 1505). If negative, i.e., the address Add1 is contained in the list AdList1 (No at step 1505), then it judges that the application specified by the application identifier App1 is not an application belonging to the first layer, returning to the process of step 1502. If affirmative, i.e., if the address Add1 is not contained in the list AdList1 (Yes at step 1505), then it judges that the application specified by the identifier App1 is an application candidate belonging to the first layer, and executes processes from step 1506 onward.

The application role specifying unit 105 judges whether the communication destination address Add2 is contained in the service execution server address list AdList1 (step 1506). If affirmative, i.e., if the address Add2 is contained in the list AdList1 (Yes at step 1506), then it judges that the application specified by the application identifier App1 is an application belonging to the first layer, and executes a process of step 1507. If negative, i.e., if the address Add2 is not contained in the list AdList1 (No at step 1506), then it judges that the application specified by the application identifier App1 is not an application belonging to the first layer, and returns to the process of step 1502.

The application role specifying unit 105 defines the application specified by the application identifier App1 to be an application belonging to the first layer, stores in the application role configuration list 400 the identifier (App1) of that application and information (layer #1) identifying a layer to which that application belongs (step 1507), and returns to the process of step 1502.

Referring to FIGS. 3 to 5, by way of example, application#1 and application#2 of all applications described in FIG. 4 are applications having communication addresses 304 different from addresses of the service execution server 102 described in FIG. 3 (192.168.2.1 to 192.168.2.6). The communication destination addresses 305 of the application#1 and application#2 are indicating the addresses of the service execution servers 102 described in FIG. 3. Hence, the application role specifying unit 105 judges that the application#1 and application#2 are the applications of the first layer which are the first applications to accept data from the exterior of the service execution server 102, and stores the application identifiers (application#1 and application#2) and the layer identifier (layer #1) into the application role configuration list 400, as shown in FIG. 5.

Referring back to FIG. 15, the application role specifying unit 105, then, specifies applications belonging to a second or subsequent layer and stores information on those applications into the application role configuration list 400 (step 1402).

Figure 17:
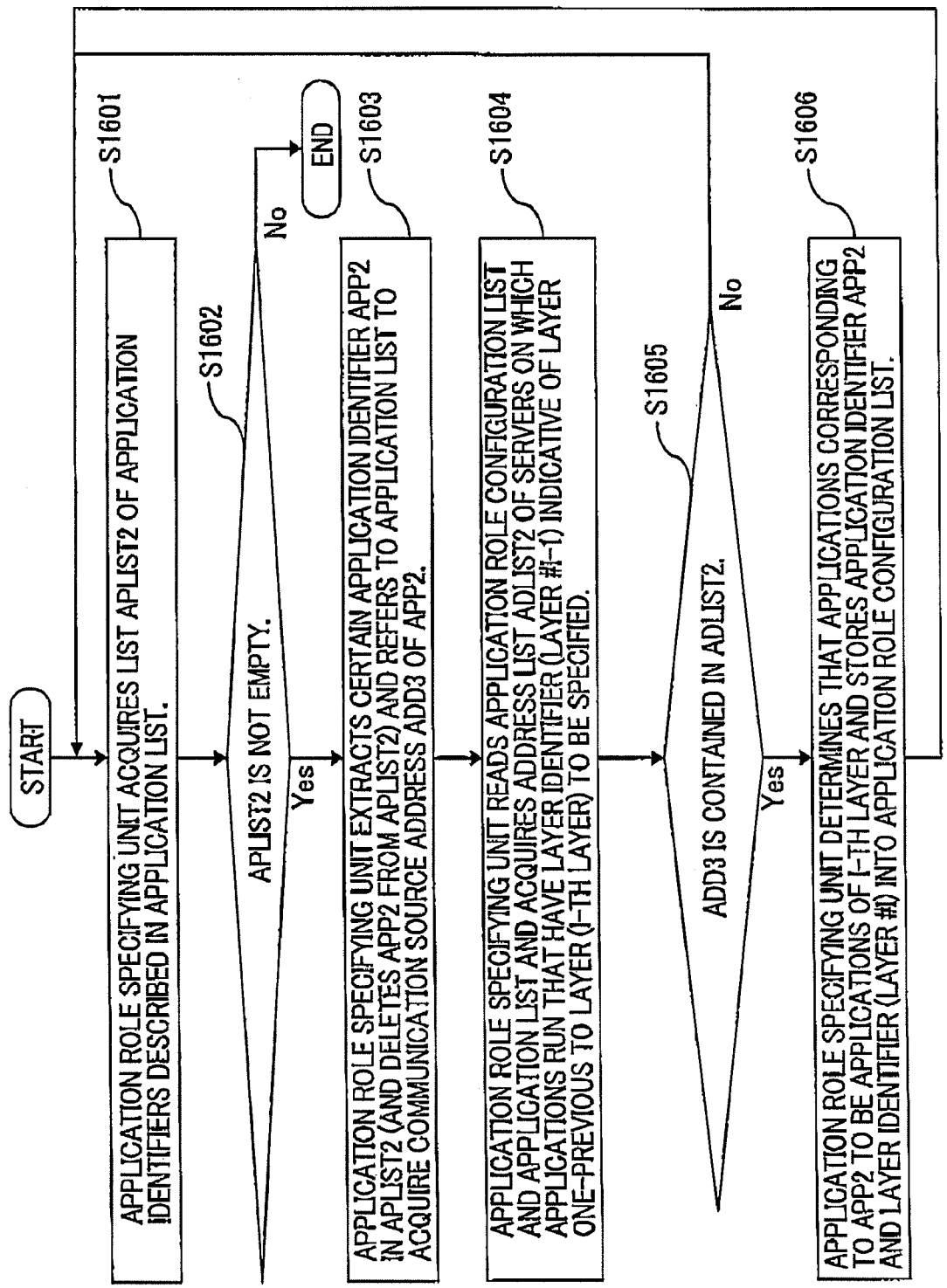
FIG. 17 is an exemplary flowchart of a procedure for specifying applications of a second or subsequent layer according to the first embodiment.

Specifically, the procedure of FIG. 17 is carried out. The application role specifying unit 105 acquires all of application identifiers described in the application list 300 to create an application identifier list ApList2 of all the application identifiers acquired (step 1601).

The application role specifying unit 105 judges whether the list ApList2 is not empty (step 1602). If negative, i.e., the list ApList2 is empty (No at step 1602), then the procedure comes to an end. If affirmative, i.e., the list ApList2 is not empty (Yes at step 1602), then the application role specifying unit 105 executes processes from step 1603 onward.

The application role specifying unit 105 extracts an arbitrary application identifier App2 described in the list ApList2 and deletes the application identifier App2 from the list ApList2 to acquire a communication source address Add3 of an application corresponding to the application identifier App2 from the application list 300 (step 1603).

The application role specifying unit 105 reads the application role configuration list 400 and acquires all of application identifiers each having a layer identifier (layer #i−1) indicative of a layer one-previous to a layer to be specified (layer i), to thereby create an address list AdList2 of servers on which applications with the layer identifier run (step 1604).

The application role specifying unit 105 judges whether the communication source address Add3 is contained in the server address list AdList2 (step 1605). If affirmative, i.e., if the address Add3 is contained in the list AdList2 (Yes at step 1605), then it judges that the application specified by the identifier App2 is an application of the i-th layer, and executes a process of step 1606. If negative, i.e., the address Add3 is not contained in the list AdList2 (No at step 1605), then it judges that the application specified by the application identifier App2 is not an application of the i-th layer, and returns to the process of step 1601.

The application role specifying unit 105 defines applications specified by the application identifier App2 as applications of the i-th layer and stores the identifier (App2) of those applications and information (layer #i) identifying a layer to which those applications belong into the application role configuration list 400 (step S1606), and returns to the process of the step 1601.

In FIGS. 4 and 5, by way of example, the application role specifying unit 105 first acquires application identifiers (application#1 and application#2) of applications having the layer identifiers of layer #1 (=2−1) described in FIG. 5. The application role specifying unit 105 then refers to the application list 300 of FIG. 4 to acquire addresses (192.168.2.1, 192.168.2.2) of servers on which applications corresponding to the application identifiers (application#1 and applicationN2) run.

The application role specifying unit 105 then defines as applications of role 2 applications having addresses 192.168.2.1 and 192,168.2.2 in the communication source address column 304, of applications described in FIG. 4, and stores application identifiers (application#3, application#4, application#5) and a layer identifier (layer #2) into the application role configuration list 400, as shown in FIG. 5.

Returning to FIG. 15 for description, the application role specifying unit 105 classifies applications into a plurality of roles to store role information on those applications into the application role configuration list 400 (step 1403).

Figure 18:
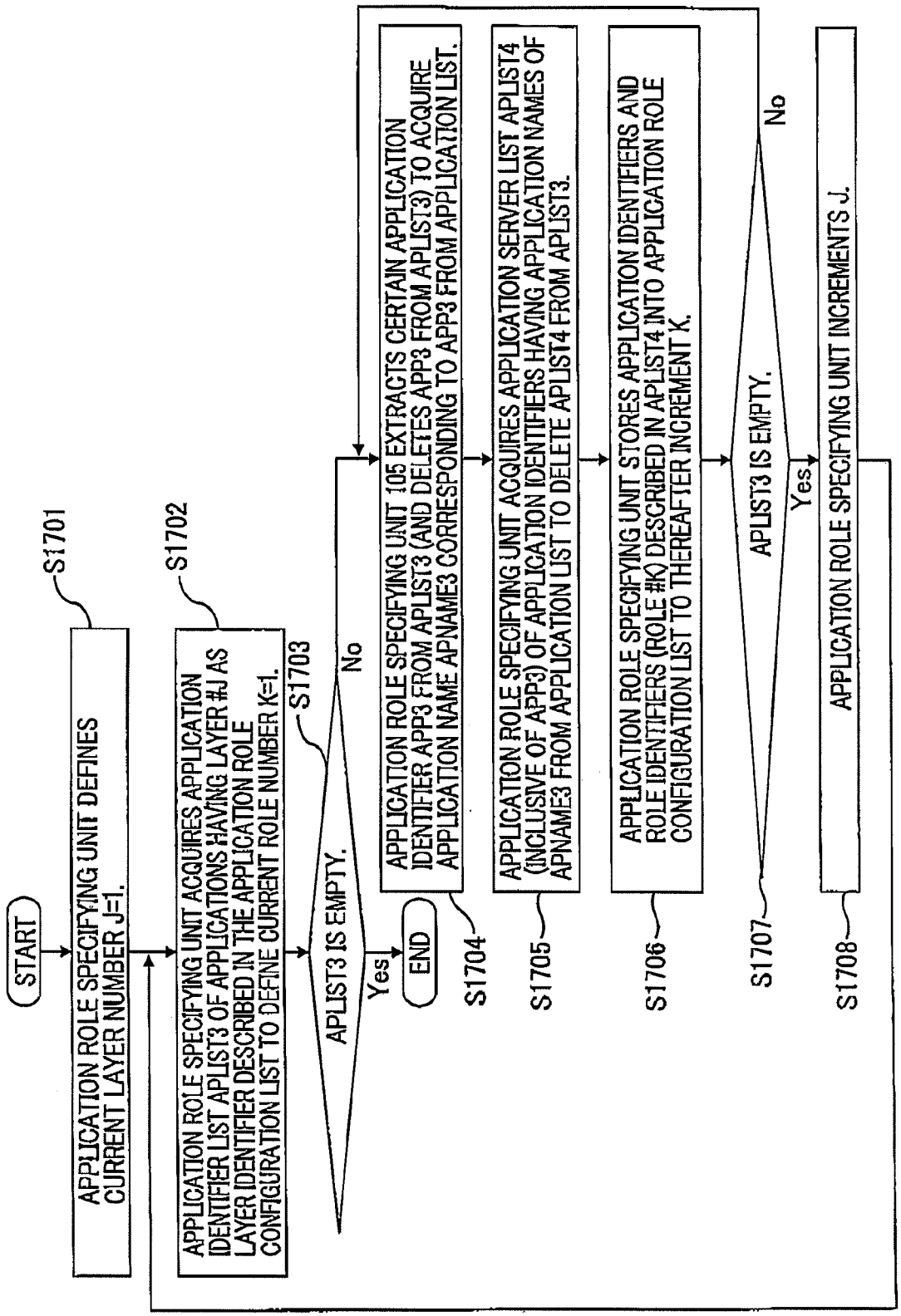
FIG. 18 is an exemplary flowchart of a procedure for specifying roles of applications according to the first embodiment.

Specifically, the procedure of FIG. 18 is carried out. The application role specifying unit 105 defines a layer number j of a current application as 1 (step 1701). The application role specifying unit 105 acquires an application identifier list ApList3 of applications having layer #j as the layer identifier described in the application role configuration list 400. The application role specifying unit 105 further defines the current role number k as 1 (step 1702).

The application role specifying unit 105 judges whether the application identifier list ApList3 is empty (step 1703). If affirmative, i.e., if ApList3 is empty (Yes at step 1703), then the procedure comes to an end. If negative, i.e., ApList3 is not empty (No at step 1703), then it executes processes from step 1704 onward. The application role specifying unit 105 extracts an arbitrary application identifier App3 from the application list ApList3 and deletes the identifier App3 from the list ApList3 so as to acquire an application name ApName3 corresponding to the identifier App3 from the application list 300 (step 1704).

The application role specifying unit 105 acquires application identifiers of applications having the same application names as ApName3 among those described in the application list 300 to create an application server list ApList4 (inclusive of App3) of the application identifiers acquired, and deletes the application identifiers described in the application identifier list ApList4 from the application identifiers described in the application identifier list ApList3 (step 1705).

The application role specifying unit 105 stores the application identifiers and role identifiers (role #k) described in the application identifier list ApList4 into the application role configuration list 400 to thereafter increment k (step 1706).

The application role specifying unit 105 judges whether the application identifier list ApList3 is empty (step 1707). If negative, i.e., if ApList3 is not empty (No at step 1707), then the procedure goes back to the process of step 1704. If affirmative, i.e., if ApList3 is empty, then a process of step 1708 is carried out. The application role specifying unit 105 increments the current layer number j (step 1708), and returns to the process of step 1702.

By way of example, description will be made of a procedure for classifying applications of a second layer into a plurality of roles. In FIGS. 4 and 5, the application role specifying unit 105 first acquires application identifiers 401 (application#3, application#4, application#5) having the layer identifier 402 of layer #2, of applications described in FIG. 5.

The application role specifying unit 105 then refers to the application list 300 of FIG. 4 to acquire application names 303 (Application B, Application C, and Application C) corresponding respectively to the application identifiers 401 (application#3, application#4, and application#5).

The application role specifying unit 105 then judges the applications having the same application name 303 of those applications to be of the same role. As shown in FIG. 5, the application role specifying unit 105 classifies the application #3 as one having a different role (the role identifier 403 of role 2) from the role of the application #4 and application #5, and classifies the application #4 and application #5 as ones having the same role as each other but having a different role (the role identifier 403 of role 3) from the role of the application #2. Afterward, the application role specifying unit 105 stores the specified role identifiers 403 into the application role configuration list 400.

Description will return to the procedure of FIG. 15. The application aggregating unit 106 refers to the application role configuration list 400 to count the numbers of applications belonging to each of the roles and stores the numbers together with the application names 303 into the aggregated application list 500 (step 1404).

In case of applications of "role #1" of FIG. 5 by way of example, the application aggregating unit 106 acquires the application identifiers 401 (application #1 and application #2) and the number (2) of the applications having the role identifier 403 of "role #1" among those described in FIG. 5. The application aggregating unit 106 acquires the application name 303 (Application A) of applications having the application identifiers 301 of "application #1" or "application #2" described in FIG. 4. The application aggregating unit 106 then stores the number of applications and the application name 303 thus acquired into the aggregated application list 500, as shown in FIG. 6.

The application aggregating unit 106 then specifies the communication source and communication destination of the applications by the role (step 1405).

Figure 19:
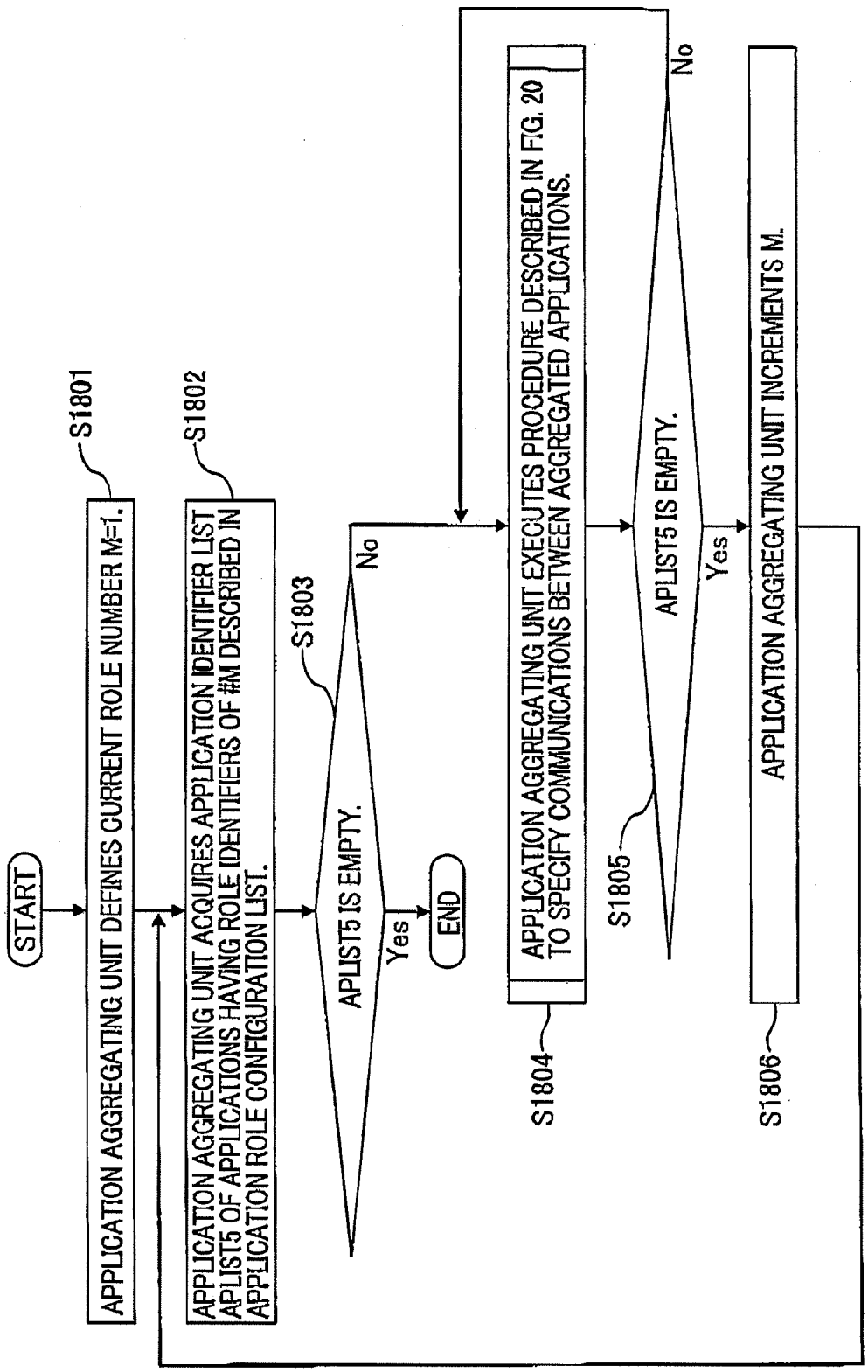
FIG. 19 is an exemplary flowchart of a procedure for specifying communications between aggregated applications according to the first embodiment.

Specifically, the procedure of FIG. 19 is carried out. The application aggregating unit 106 defines the current role number m as 1 (step 1801). The application aggregating unit 106 acquires the application identifiers 401 of applications having the role identifiers 403 of role #m described in the application role configuration list 400, to create an application identifier list ApList5 of the application identifiers (step 1802).

The application aggregating unit 106 judges whether the application identifier list ApList5 is empty (step 1803). If affirmative, i.e., if Aplist5 is empty (Yes at step 1803), then the procedure comes to an end. If negative, i.e., if Aplist5 is not empty (No at step 1803), then the application aggregating unit 106 executes processes from step 1804 onward.

Figure 20:
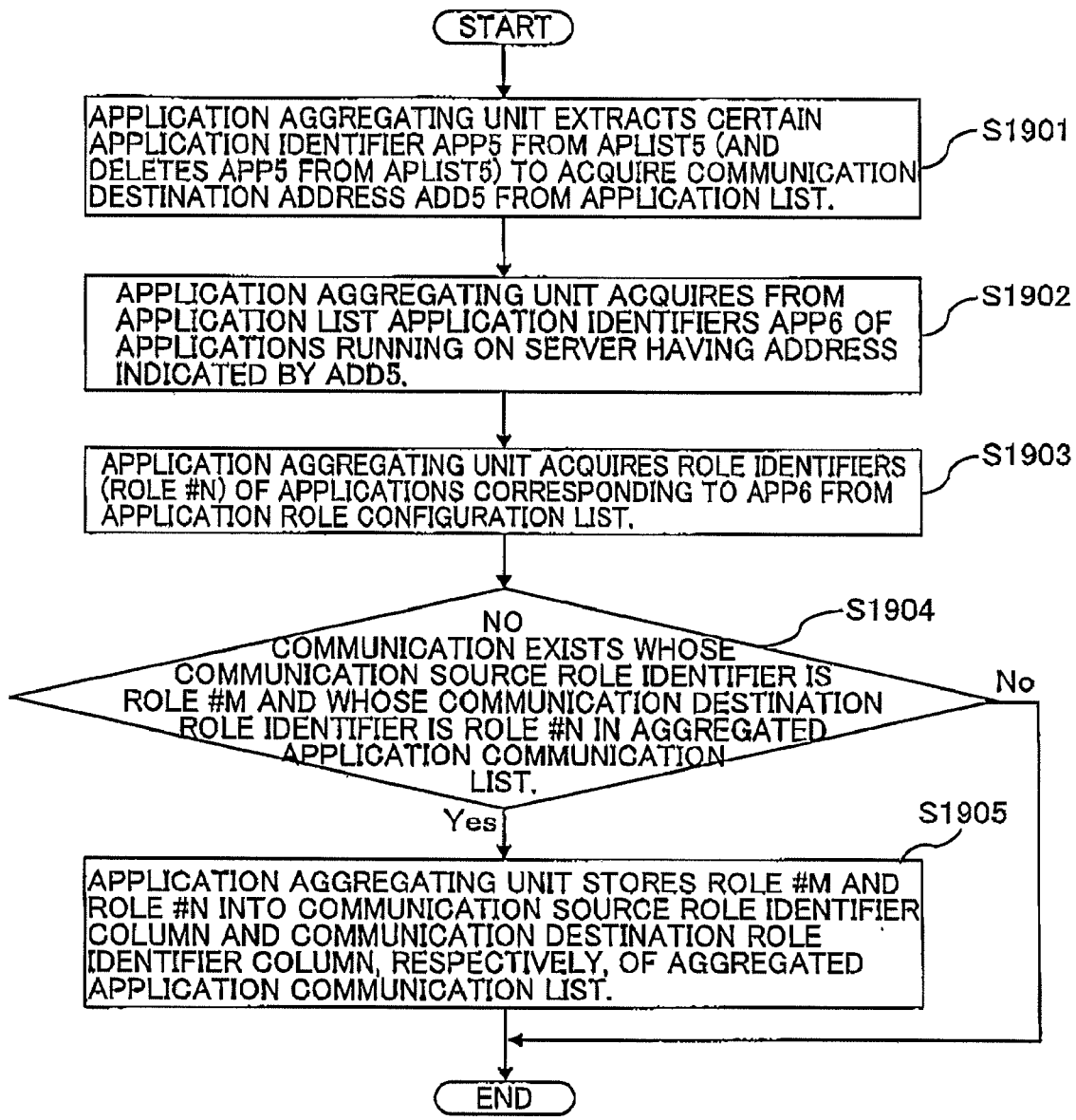
FIG. 20 is an exemplary detailed flowchart of a procedure for specifying communications between aggregated applications according to the first embodiment.

The application aggregating unit 106 then executes processes from step 1901 to 1905 described in FIG. 20 to specify communications between aggregated applications (step 1804). Specifically, the application aggregating unit 106 first extracts an arbitrary application identifier App5 from the application identifier list ApList5 and deletes the application identifier App5 from the list Aplist5, to acquire a communication destination address Add5 corresponding to the application identifier App5 from the application list 300 (step 1901).

The application aggregating unit 106 acquires from the application list 300 application identifiers App6 of applications running on a server having an address indicated by Add5 (step 1902).

The application aggregating unit 106 acquires role identifiers (role #n) of applications corresponding to the application identifiers App6 from the application role configuration list 400 (step 1903).

The application aggregating unit 106 refers to the aggregated application communication list 600 to judge whether no communication exists whose communication source role identifier 601 is role #m and whose communication destination role identifier 602 is role #n (step 1904). If negative, i.e., if the communication exists (No at step 1904), then the application aggregating unit 106 executes the processes from step 1805 onward without execution of a process of step 1905. If affirmative, i.e., if no communication exists (Yes at step 1904), then it executes the process of step 1905 to thereafter execute the processes from step 1805 onward.

When the communication does not exist, the application aggregating unit 106 stores role #m and role #n into the communication source role identifier column and the communication destination role identifier column, respectively, of the aggregated application communication list 600 (step 1905), and returns the procedure to step 1805 of FIG. 19.

The application aggregating unit 106 then judges whether the application identifier list ApList5 is empty (step 1805). If negative, i.e., if not empty (No at step 1805), then the procedure returns to the process of step 1804, whereas if affirmative, i.e., if empty (Yes at step 1805), then the application aggregating unit 106 executes a process of step 1806. The application aggregating unit 106 increments the current role number m (step 1806), and returns to the process of step 1802.

Description will be given of a process of specifying a role of communicating with role #1 by way of example. The application aggregating unit 106 acquires the application identifiers 401 (application #1 and application #2) of applications having the role identifiers 403 of "role #1" stored in the application role configuration list 400 of FIG. 5.

The application aggregating unit 106 then refers to the application list 300 of FIG. 4 to acquire the communication destination addresses 305 (192.168.2.3, 192.168.2.4, and 192.168.2.5 for both) of applications specified by the application identifiers 301 of application #1 and application #2.

The application aggregating unit 106 refers to the application list 300 of FIG. 4 to acquire the application identifiers 301 (application #3, application #4, and application #5) of applications running on servers having the addresses acquired.

The application aggregating unit 106 then refers to the application role configuration list 400 of FIG. 5 to acquire the role identifiers 403 (role #2, role #3, and role #3) corresponding to the application identifiers 401 acquired. The application aggregating unit 106 then stores role #1 and role #2 into the communication source role identifier column and the communication destination role identifier column, respectively, of the aggregated application communication list 600, as shown in FIG. 7. The application aggregating unit 106 further stores role #1 and role #3 into the communication source role identifier column and the communication destination role identifier column, respectively, of the aggregated application communication list 600.

The application configuration diagram creating unit 107 reads the aggregated application list 500 and the aggregated application communication list 600 to create an application configuration diagram (step 1406).

To summarize, the first embodiment makes use of: the service execution server list 200 storing addresses of servers such as the service execution servers 102 to be managed by the operation management server 100; the application list 300 storing information of applications running on servers to be managed; the application role configuration list 400 storing information roles in a service system of applications stored in the application list 300; the aggregated application list 500 storing information on roles of applications classified by the application aggregating unit; and the aggregated application communication list 600 storing information on role-to-role communications. The first embodiment through use of the above lists includes the following steps of: specifying application roles in the service system from the service execution server list 200 and the application list 300 for storage in the application role configuration list 400; aggregating applications by roles from the application list 300 and the application role configuration list 400 for storage of the aggregation result into the aggregated application list 500 and the aggregated application communication list 600; and creating an application configuration diagram from the aggregated application list 500 and the aggregated application communication list 600.

According to the first embodiment, without any know-how, application configuration diagrams can be created that allow the system administrator to grasp the current configuration at a single glance, by providing aggregated displays of applications for each of roles in a service system.

It is to be noted that the first embodiment may or may not use: the service system specifying unit 108, the configuration change managing unit 109, the setting change managing unit 110, the service system list 700, the application configuration baseline 800, the application configuration change list 900, the setting change apply list 1000, the physical/logical(virtual) server list 1200, and the shared application list 1300.

The operation management server 100 of the first embodiment may or may not be provided with: the service system specifying unit 108, the configuration change managing unit 109, the setting change managing unit 110, the service system list 700, the application configuration baseline 800, the application configuration change list 900, the setting change apply list 1000, the physical/logical(virtual) server list 1200, and the shared application list 1300.

Second Embodiment

Figure 21:
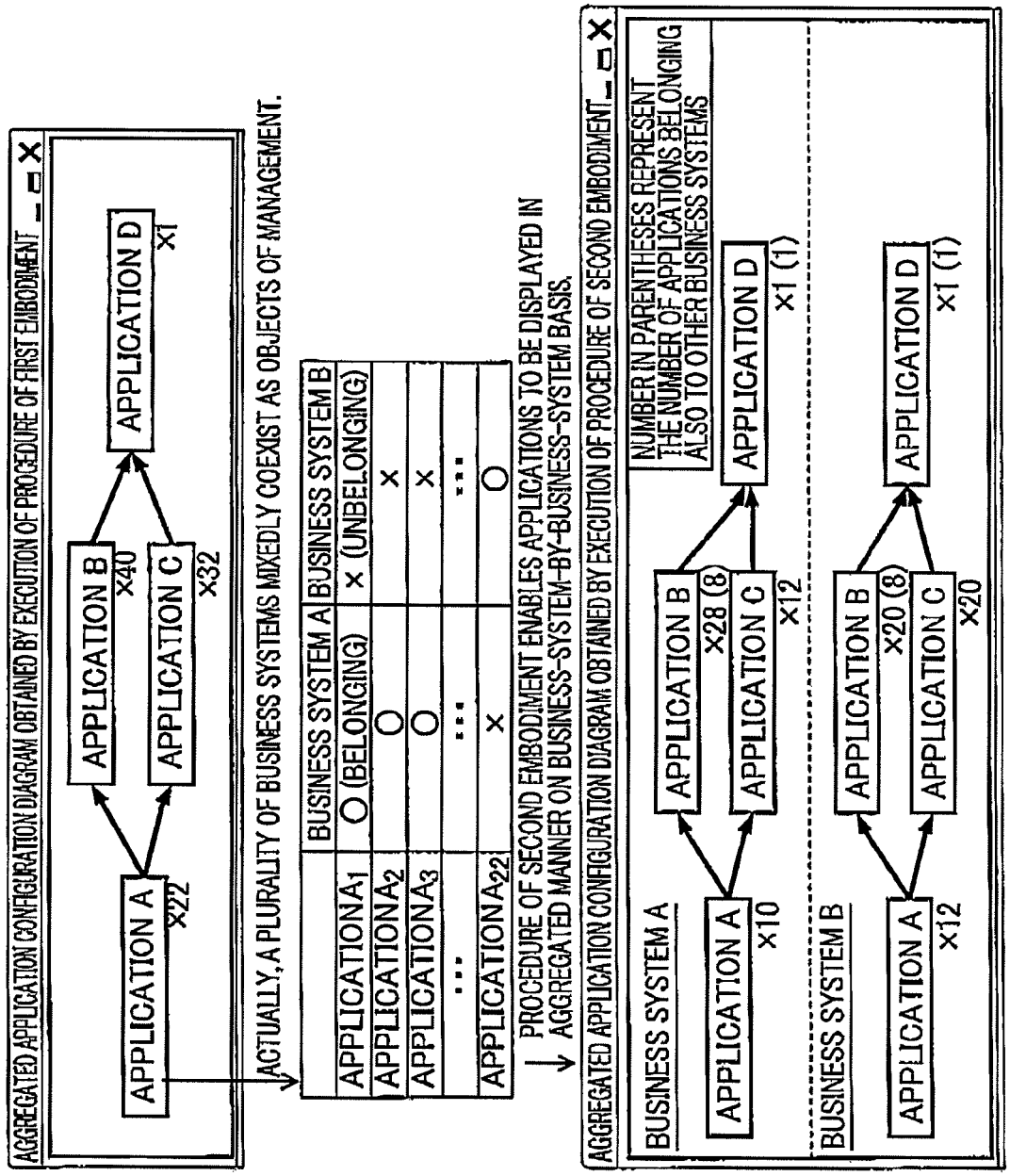
FIG. 21 is an explanatory diagram of a problem involved in an environment where a plurality of service systems mixedly coexist.

In the first embodiment, even when a plurality of service systems mixedly coexist, they are aggregated according to roles, but the aggregation and display may also be performed according to service systems as shown in FIG. 21. To this end, HTTP communications are attempted to addresses of servers on which applications of the first layer run, and titles of displayed pages are acquired to add a process of specifying, by the titles, service systems to which the applications belong.

Figure 22:
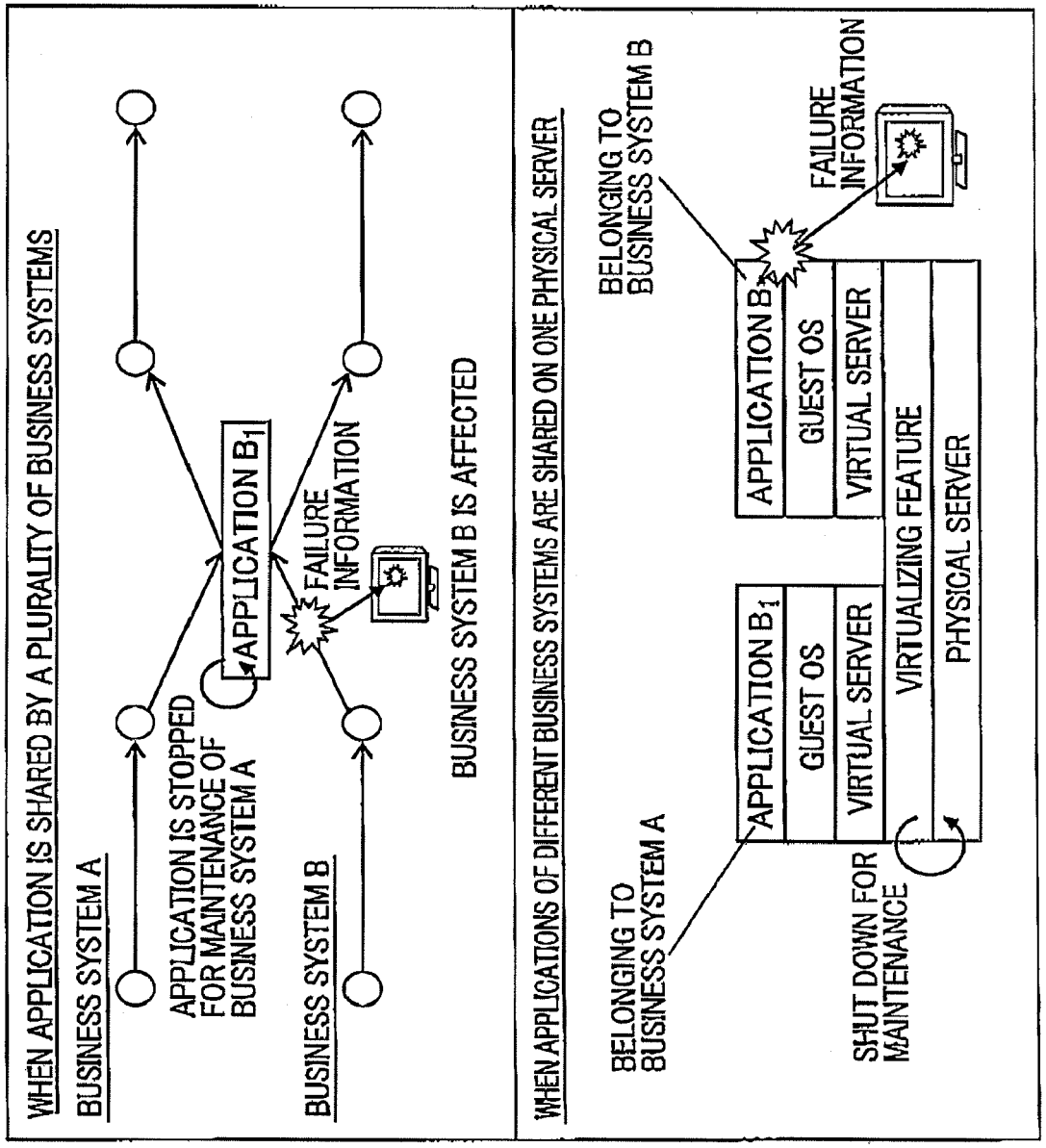
FIG. 22 is an explanatory diagram of a problem involved in sharing of applications by the plurality of service systems.

A second embodiment of the present invention provides a method of automatically specifying service systems to which applications running on the servers belong and aggregating applications according to service systems to create an application configuration diagram when the servers such as the service execution servers 102 to be managed consist of a plurality of the service systems. The second embodiment further provides a method of aggregating individually applications shared by a plurality of service systems or applications running on virtual servers working on the same physical server as shown in FIG. 22 when the applications are aggregated and displayed according to service systems, so that those events can be grasped, to create an application configuration diagram.

In the second embodiment, the following procedure is executed of specifying service systems on which applications run, in addition to the steps 1401 to 1406 described in the first embodiment. HTTP communications are performed with applications of the first layer specified by the application role specifying unit 105 to specify service systems on which those applications run by titles of files specified by title tags of Web pages acquired, to thereby regard a series of applications of the second or subsequent layer in communication with those applications as belonging to the same service systems, thus specifying relevant service systems for all the applications.

Figure 23:
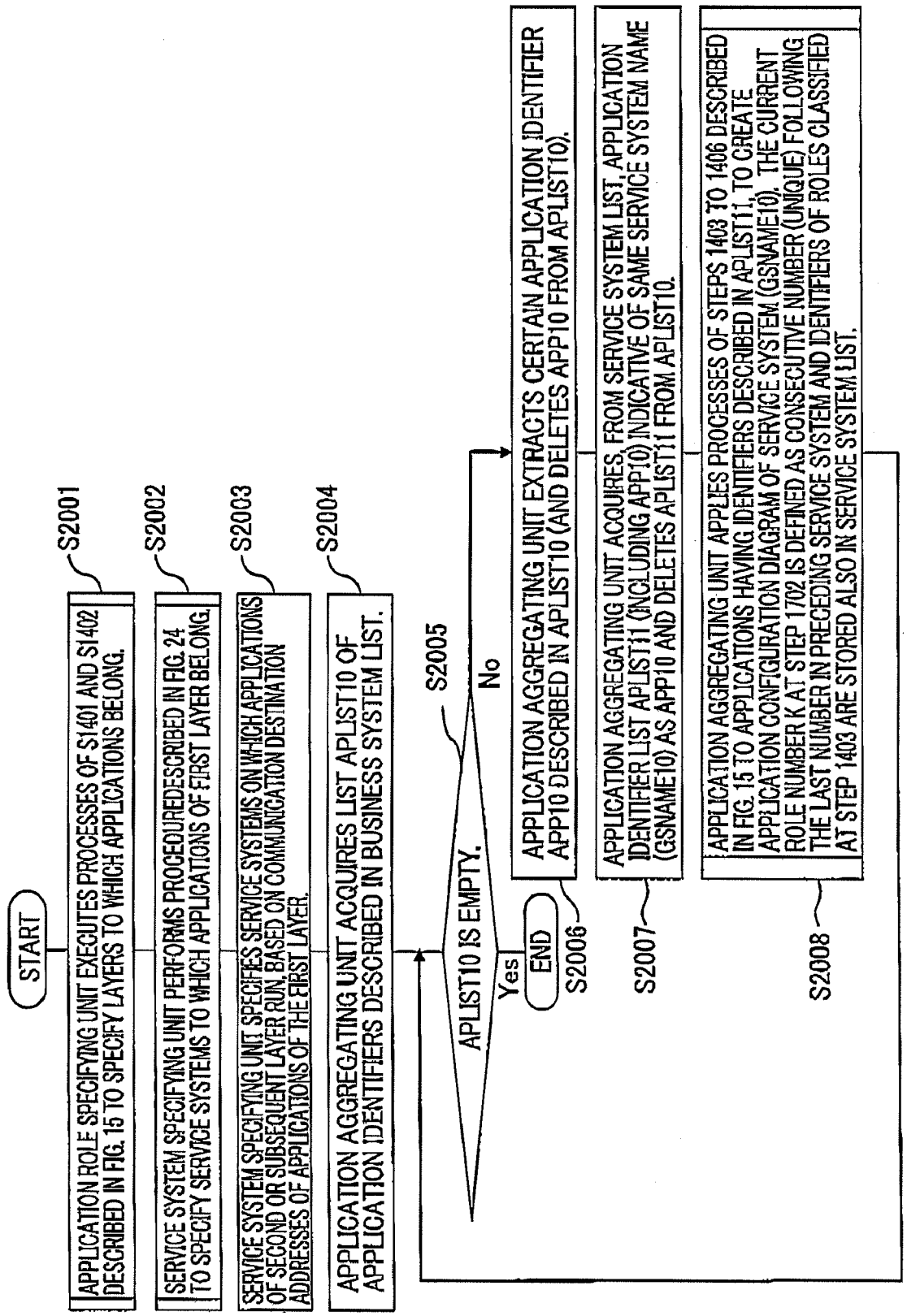
FIG. 23 is an exemplary flowchart of a procedure for specifying service systems according to a second embodiment of the present invention.

FIG. 23 is a flowchart of a procedure for specifying service systems of applications in the second embodiment.

The application role specifying unit 105 executes the processes of steps 1401 and 1402 described in FIG. 15 to specify layers to which the applications belong (step 2001).

The service system specifying unit 108 first specifies service systems to which applications of the first layer belong (step 2002).

Figure 24:
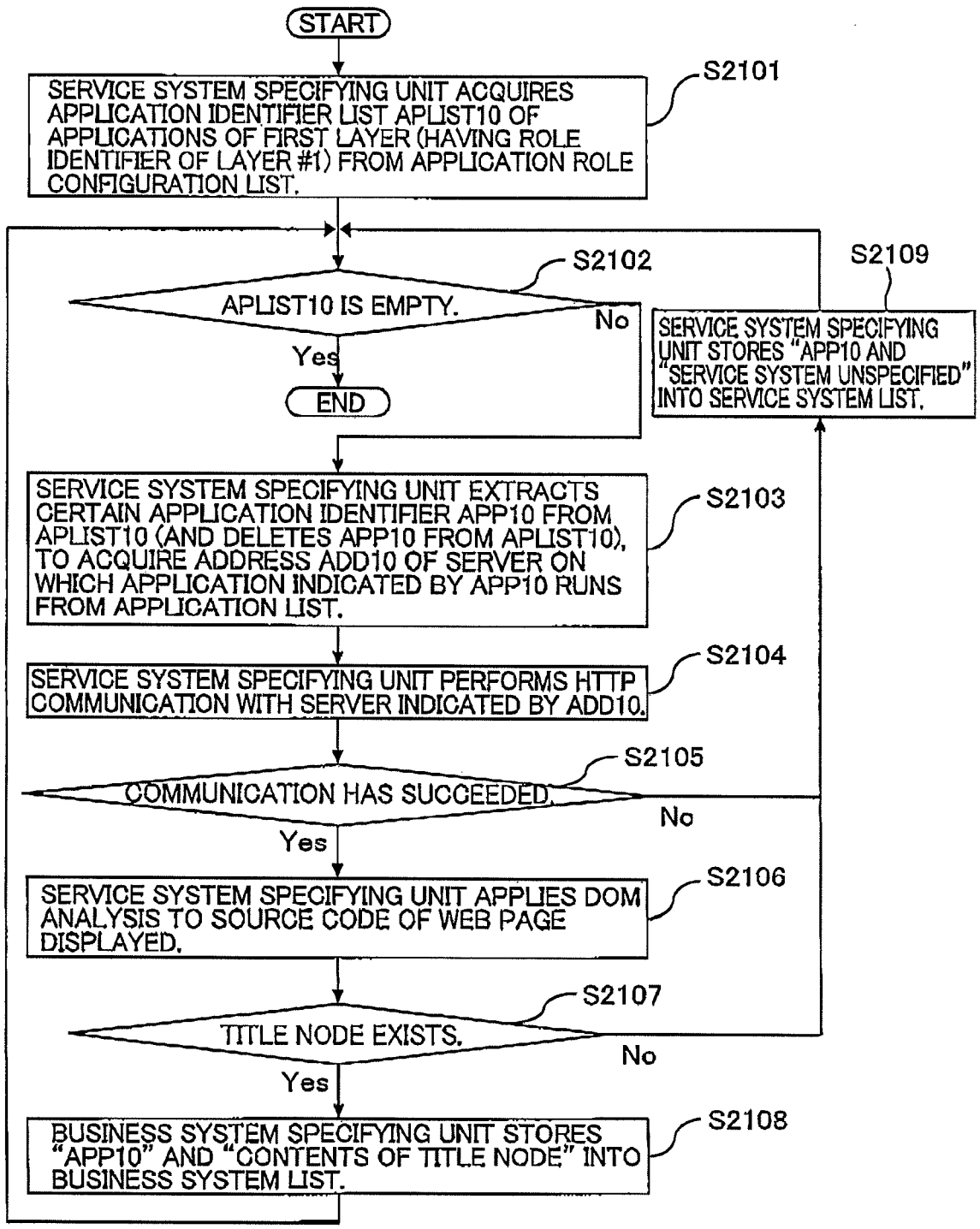
FIG. 24 is an exemplary flowchart of a procedure for specifying service systems to which applications of the first layer belong according to the second embodiment.

Specifically, the procedure of FIG. 24 is carried out. The service system specifying unit 108 refers to the application role configuration list 400 to acquire application identifiers 401 of applications each having the layer identifier 402 of layer #1 to create a list ApList10 of the application identifiers 401 (step 2101).

The service system specifying unit 108 judges whether the application identifier list ApList10 is empty (step 2102) and, if ApList10 is empty (Yes at step 2102), executes processes from step 2003 onward, whereas if not empty (No at step 2102), it executes processes from step 2103 onward.

The service system specifying unit 108 extracts an arbitrary application identifier App10 from the application identifier list ApList10 and deletes the application identifier App10 from the list ApList10, to acquire an address Add10 of a server on which an application specified by App10 runs from the application list 300 (step 2103).

The service system specifying unit 108 adds "httpd://" anterior to Add10 and adds "/" posterior to Add10 to send an HTTP connection request by way of the transmitter/receiver unit 103 (step 2104).

The service system specifying unit 108 makes judgment of whether the communication has succeeded (step 2105) and, if affirmative (Yes at step 2105), executes processes from step 2106 onward, whereas if negative (No at step 2105), then it performs a process of step 2109.

The service system specifying unit 108 applies DOM analysis to a source code of a Web page acquired and displayed from the address via the communication (step S2106).

Based on the result of the DOM analysis applied to the source code of the Web page displayed, the service system specifying unit 108 judges whether a Title node exists (step 2107) and, if affirmative (Yes at step 2107), executes a process of step 2108, whereas if negative, then it executes the process of step 2109.

If the Title node is present, the service system specifying unit 108 stores App10 and the contents of the Title node into the application identifier column 701 and the service system name column 702, respectively, of the service system list 700 (step 2108).

If the Title node is absent, the service system specifying unit 108 stores App10 and information indicative of service system being unspecified into the application identifier column 701 and the service system name column 702, respectively, of the service system list 700 (step 2109).

The service system specifying unit 108 specifies service systems on which applications of the second or subsequent layer run, based on communication destination addresses of applications of the first layer (step 2003).

Specifically, the service system specifying unit 108 acquires application identifiers 401 of applications having the layer identifier 402 of layer #1 described in the application role configuration list 400, to create a list ApList100 of application identifiers 401.

The service system specifying unit 108 acquires an arbitrary application identifier App100 from the application identifier list ApList100. The service system specifying unit 108 reads the application list 300 to acquire all of communication destination addresses Add100 of applications indicated by the application identifier App100.

The service system specifying unit 108 reads the application list 300 to acquire applications App101 running on servers indicated by the communication destination address Add100 so as to store App101 and names of service systems on which applications specified by the application identifier App100 run into the application identifier column 701 and the service system name column 702, respectively, of the service system list 700. The above processes are repeated to specify service systems on which applications of the third or subsequent layer run.

The application aggregating unit 106 acquires application identifiers 701 described in the service system list 700 to create a list ApList10 of the application identifiers 701 (step 2004).

The application aggregating unit 106 judges whether the application identifier list ApList10 is empty (step 2005) and, if affirmative (Yes at step 2005), terminates the procedure, whereas if negative (No at step 2005), it executes processes from step 2006 onward.

The application aggregating unit 106 extracts an arbitrary application identifier App10 stored in the application identifier list ApList10 and deletes the application identifier App10 from the list ApList10 (step 2006).

The application aggregating unit 106 acquires from the service system list 700 an application identifier list ApList11 (including App10) indicative of the same service system name (GSName10) as one of the application identifier App10 and deletes the application identifier list ApList11 from the list ApList10 (step 2007).

The application aggregating unit 106 applies the processes from the steps 1403 to 1406 described in FIG. 15 to applications having identifiers described in ApList11, to create an application configuration diagram of the service system (GSName10).

The current role number k at step 1702 is defined as a consecutive number (unique) following the last number in the preceding service system, and identifiers of roles classified at step 1403 are stored in the service system list 700 as well (step 2008), returning the procedure to the process of step 2005.

Figure 25:
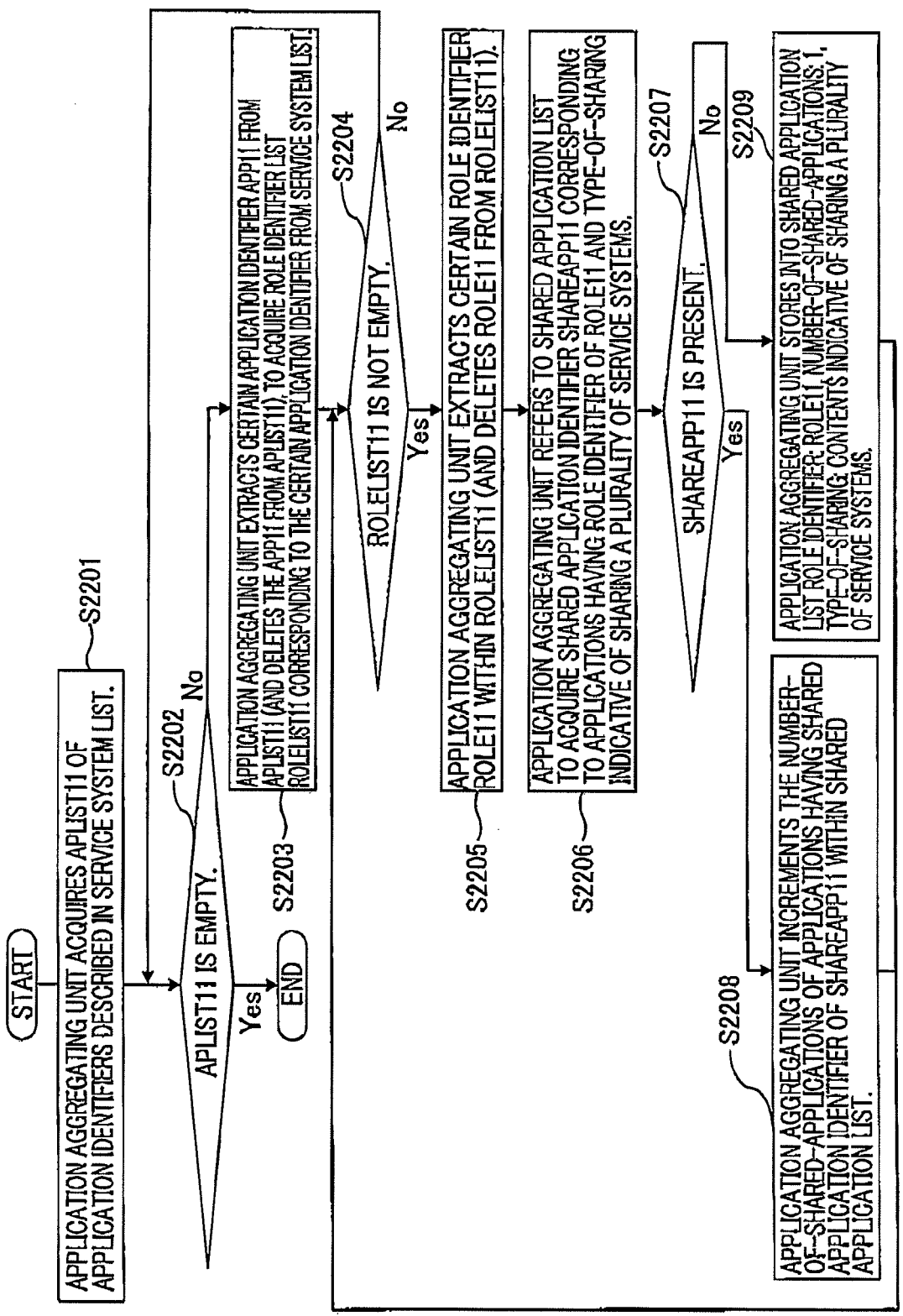
FIG. 25 is an exemplary flowchart of a procedure for specifying applications shared by a plurality of service systems according to the second embodiment.

Description will next be given of a procedure for specifying applications shared by a plurality of service systems. FIG. 25 is a flowchart of a procedure for specifying applications shared by the plurality of service systems in the second embodiment. The flow is executed in addition to the flow specifying the service systems shown in FIG. 23.

The application aggregating unit 106 acquires the list ApList11 of application identifiers described in the service system list 700 (step 2201).

The application aggregating unit 106 judges whether the application identifier list ApList11 is empty (step 2202) and, if affirmative (Yes at step 2202), brings the procedure to an end, whereas if negative (No at step 2202), it executes processes from step 2203 onward.

If the application identifier list ApList11 is not empty, then the application aggregating unit 106 extracts an arbitrary application identifier App11 from the list ApList11 and deletes the application identifier App11 from the list ApList11, to acquire a role identifier list RoleList11 corresponding to the application identifier App11 from the service system list 700 (step 2203).

The application aggregating unit 106 judges whether the role identifier list RoleList11 is not empty (step 2204) and, if negative (No at step 2204), returns to the process of step 2202, whereas if affirmative (Yes at step 2204), it executes processes from step 2205 onward.

If the role identifier list RoleList11 is not empty, the application aggregating unit 106 extracts an arbitrary role identifier Role11 within the list RoleList11 and deletes the role identifier Role11 from the role identifier list RoleList11 (step 2205).

The application aggregating unit 106 refers to the shared application list 1300 to acquire a shared application identifier ShareApp11 corresponding to applications having the role identifier 1301 of role11 and the type-of-sharing 1303 indicative of sharing a plurality of service systems (step 2206).

The application aggregating unit 106 judges whether the shared application identifier SharedApp11 exists (step 2207) and, if affirmative (Yes at step 2207), executes a process of step 2208, whereas if negative (No at step 2207), it executes a process of step 2209.

If the shared application identifier ShareApp11 is present, then the application aggregating unit 106 increments the number-of-shared-applications of applications having the shared application identifier of ShareApp11 within the shared application list 1300 (step 2208).

The application aggregating unit 106 stores Role11 into the role identifier column 1301 of the shared application list 1300, stores 1 into the number-of-shared-applications column 1302, and stores the contents indicative of sharing a plurality of service systems into the type-of-sharing column 1303 (step 2209).

Figure 26:
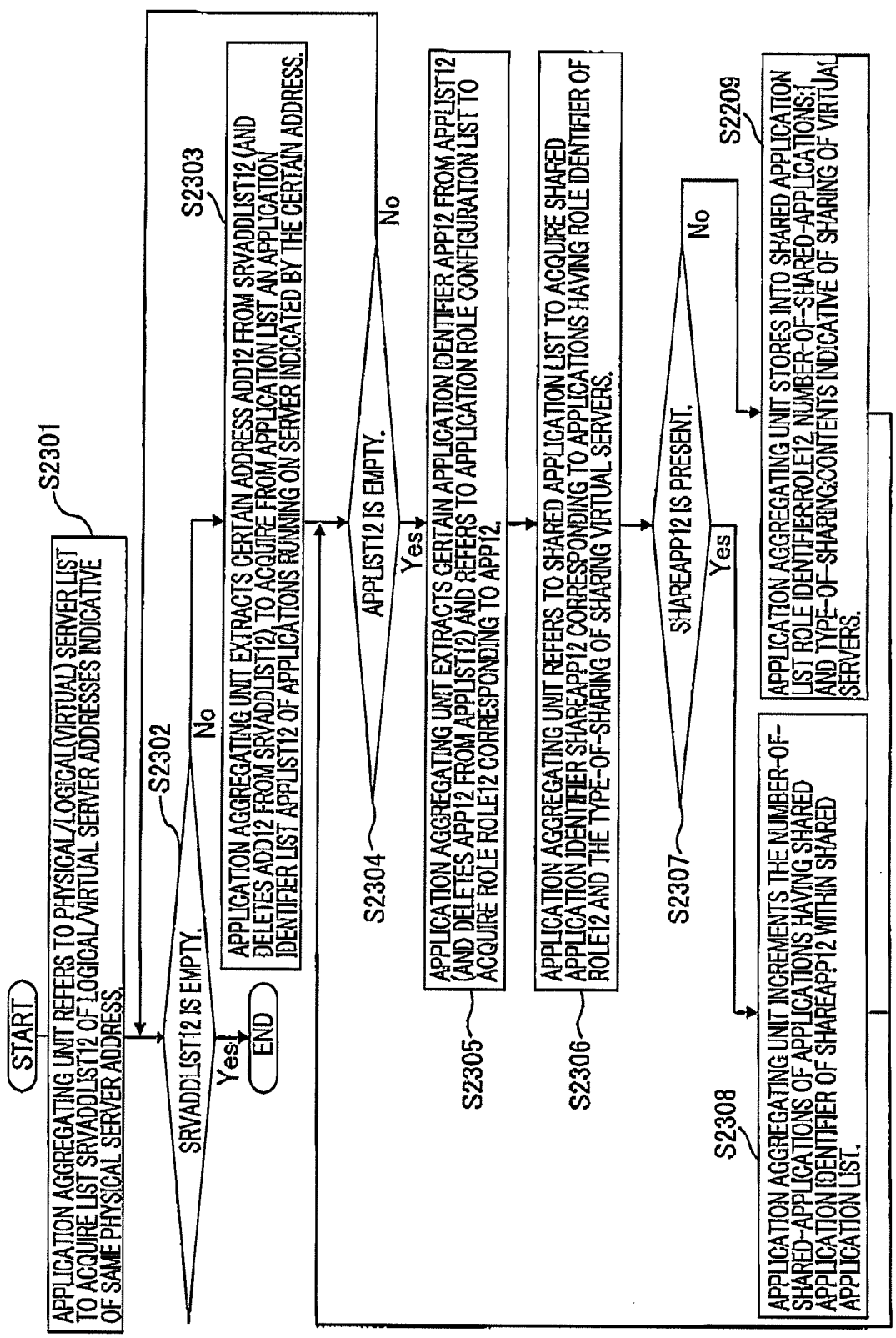
FIG. 26 is an exemplary flowchart of a procedure for specifying applications running on virtual servers working on the same physical server according to the second embodiment.

Description will next be given of a procedure for specifying applications running on virtual servers that work on the same physical server. FIG. 26 is a flowchart of a procedure for specifying applications running on virtual servers that work on the same physical server in the second embodiment. The flow is executed in addition to the flow specifying the service systems shown in FIG. 23.

The application aggregating unit 106 refers to the physical/logical(virtual) server list 1200 to acquire a list SrvAddList12 of logical/virtual server addresses indicative of the same physical server address 1201 (step 2301).

The application aggregating unit 106 judges whether the list SrvAddList12 is empty (step 2302) and, if affirmative (Yes at step 2302), brings the procedure to an end, whereas if negative (No at step 2302), it executes processes from step 2303 onward.

If the physical/logical server address list SrvAddList12 is not empty, then the application aggregating unit 106 extracts an arbitrary address Add12 from the list SrvAddList12 (and deletes the address Add12 from the list SrvAddList12), to acquire from the application list 300 an application identifier list AppList12 of applications running on a server indicated by the address Add12 (step 2303).

The application aggregating unit 106 judges whether the application identifier list AppList12 is empty (step 2304) and, if affirmative (Yes at step 2304), returns to the process of step 2302, whereas if negative (No at step 2304), it executes processes from step 2305 onward.

If the application identifier list AppList12 is not empty, then the application aggregating unit 106 extracts an arbitrary application identifier App12 from the list AppList12, deletes the application identifier App12 from the list AppList12, and refers to the application role configuration list 400 to acquire a role Role12 corresponding to the application identifier App12 (step 2305).

The application aggregating unit 106 refers to the shared application list 1300 to acquire a shared application identifier ShareApp12 corresponding to applications having the role identifier 1301 of Role12 and the type-of-sharing 1303 of sharing virtual servers (step 2306).

The application aggregating unit 106 judges whether the shared application identifier ShareApp12 exist (step 2307) and, if affirmative (Yes at step 2307), executes a process of step 2308, whereas if negative (No at step 2307), it executes a process of step 2309.

If the shared application identifier ShareApp12 is present, the application aggregating unit 106 increments the number-of-shared-applications of applications having the shared application identifier of ShareApp12 within the shared application list 1300 (step 2308).

If the shared application identifier ShareApp12 is absent, the application aggregating unit 106 stores Role12 into the role identifier column 1301 of the shared application list 1300, stores 1 into the number-of-shared-applications column 1302, and the contents of sharing virtual servers into the type-of-sharing column 1303 (step 2309).

To summarize, the second embodiment makes use of: the service execution server list 200 storing therein addresses of servers such as the service execution servers 102 to be managed by the operation management server 100; the application list 300 storing information of applications running on servers to be managed; the application role configuration list 400 storing information roles in a service system of applications stored in the application list 300; the aggregated application list 500 storing therein information on roles of applications classified by the application aggregating unit; the aggregated application communication list 600 storing information on role-to-role communications; the service system list 700 storing therein service systems to which applications belong; the physical/logical(virtual) server list 1200 storing types of servers on which the applications run; and the shared application list 1300 storing the contents that an application is shared by a plurality of service systems or that a physical server having active applications thereon is shared by other service systems. The second embodiment through use of the above lists includes the following steps of: specifying application roles in the service systems from the service execution server list 200 and the application list 300 for storage in the application role configuration list 400; acquiring addresses of servers on which applications of role 1 run from the application role configuration list 400 and the application list 300; attempting HTTP communications with the acquired addresses to specify pages displayed upon the execution of HTTP communications as service systems to which the applications belong; aggregating the applications on a role-by-role basis from the application list 300 and the application role configuration list 400 in a prejudged service system for storage of the aggregation results into the aggregated application list 500 and the aggregated application communication list 600; storing from the service system list 700 the number of applications shared by a plurality of service systems into the shared application list 1300; referring to the application list 300, the service system list 700, and the physical/logical (virtual) server list 1200 to store into the shared application list 1300 the number of applications running on virtual servers working on the same physical server; and creating an application configuration diagram from the aggregated application list 500, the aggregated application communication list 600, and the shared application list 1300.

According to the second embodiment, even when a plurality of service systems mixedly coexist as objects to be managed by the operation management server 100, application configuration diagrams can be created that allow the system administrator to grasp the current configuration at a single glance, by automatically specifying service systems to which applications belong and providing aggregated displays of the applications for each of the service systems.

Further, even when one application is shared by a plurality of service systems or even when there exist applications of different service systems working on the same physical server, application configuration diagrams can be created that allow the system administrator to grasp the current configuration at a single glance, by aggregating the applications by shared applications.

The second embodiment may or may not use the configuration change managing unit 109, the setting change managing unit 110, the application configuration baseline 800, the application configuration change list 900, and the setting change apply list 1000. The operation management server 100 may or may not be provided with the configuration change managing unit 109, the setting change managing unit 100, the application configuration baseline 800, the application configuration change list 900, and the setting change apply list 1000.

Third Embodiment

Figure 27:
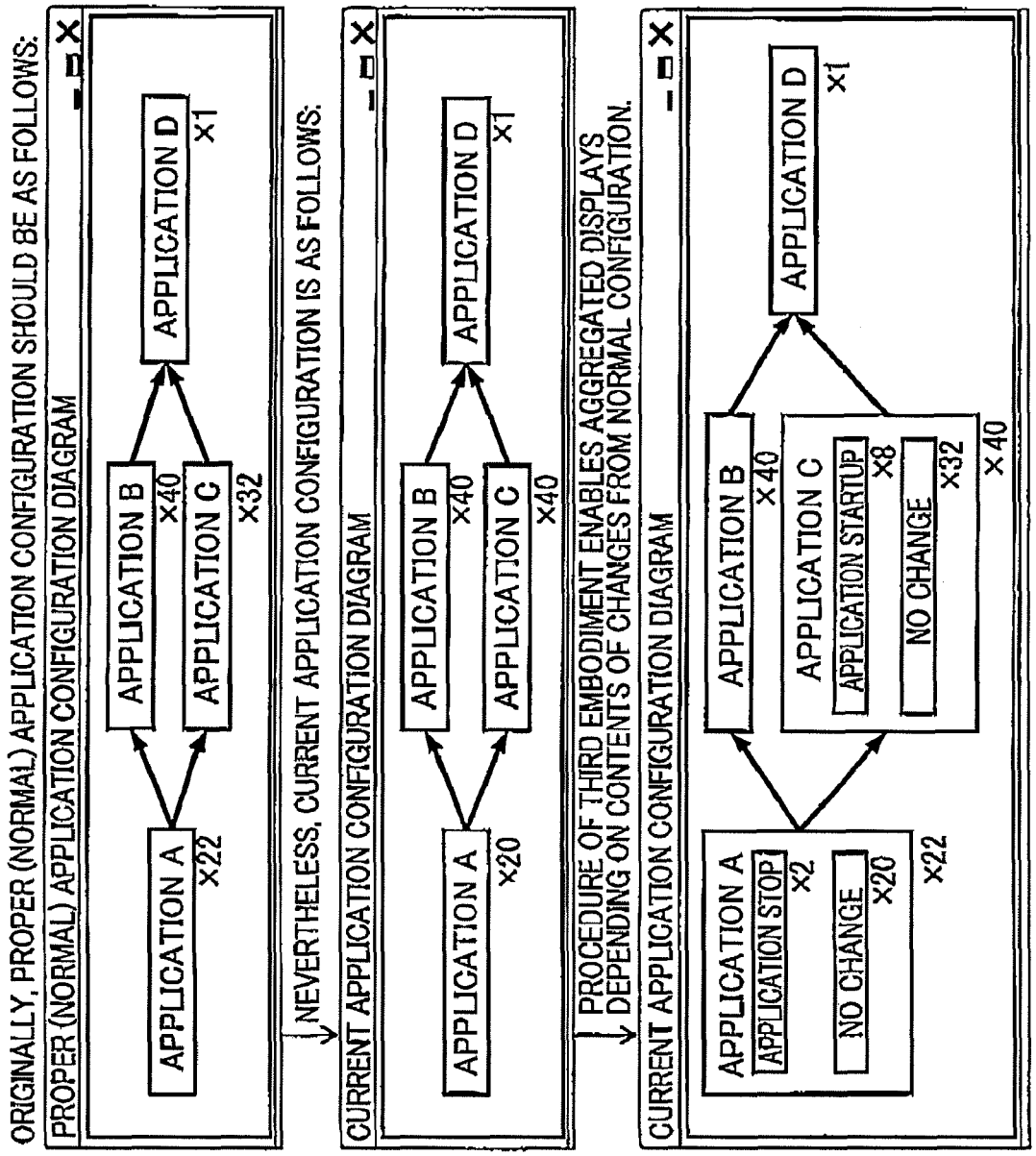
FIG. 27 is an exemplary configuration diagram of applications aggregated by a procedure of a third embodiment of the present invention.

In the first embodiment, even when a plurality of service systems mixedly coexist, the plurality of service systems are brought together so that applications are aggregated according to roles of the applications. As shown in FIG. 27, aggregation may also be made based on given additional information (e.g., setting information on each application, change information or fault information on each application) so that displays can be provided so as to allow the system administrator to intuitively grasp applications needing any measures or modifications such as a singular application having different settings from others (which may probably be attributable to setting error) or applications having changes or faults. To this end, an additional process is provided to classify applications based on the setting information, change information, fault information, etc.

A third embodiment of the present invention provides a method of, when additional information is given to applications running on objects to be managed such as the service execution server 102, aggregating the applications depending on the additional information to create an application configuration diagram. As used herein, additional information means various pieces of information of applications to be aggregated, such as configuration change information of applications, host type information of hosts (such as a virtual server, a physical server, or a logical server) on which the applications run, and setting information difference information of applications.

By way of example of the third embodiment, description will be made of a method of, when the application configuration baseline 800 indicating a proper application configuration is given as shown in FIG. 27, comparing the current application configuration with the baseline 800 to specify changes in the configuration and aggregating applications by the contents of the changes in the configuration so as to allow the system administrator to grasp information on changes of applications to be managed at a single glance.

Following the steps 1401 to 1407 described in the first embodiment, to implement the method, additional processes are provided of: storing into the application configuration change list 900 the result of comparison of the configuration baseline 800 of a given application with the current configuration of each of applications; specifying a group of the application based on the contents stored in the application configuration change list 900; and storing identification information specifying the role of the application into the application role configuration list 400.

Figure 28:
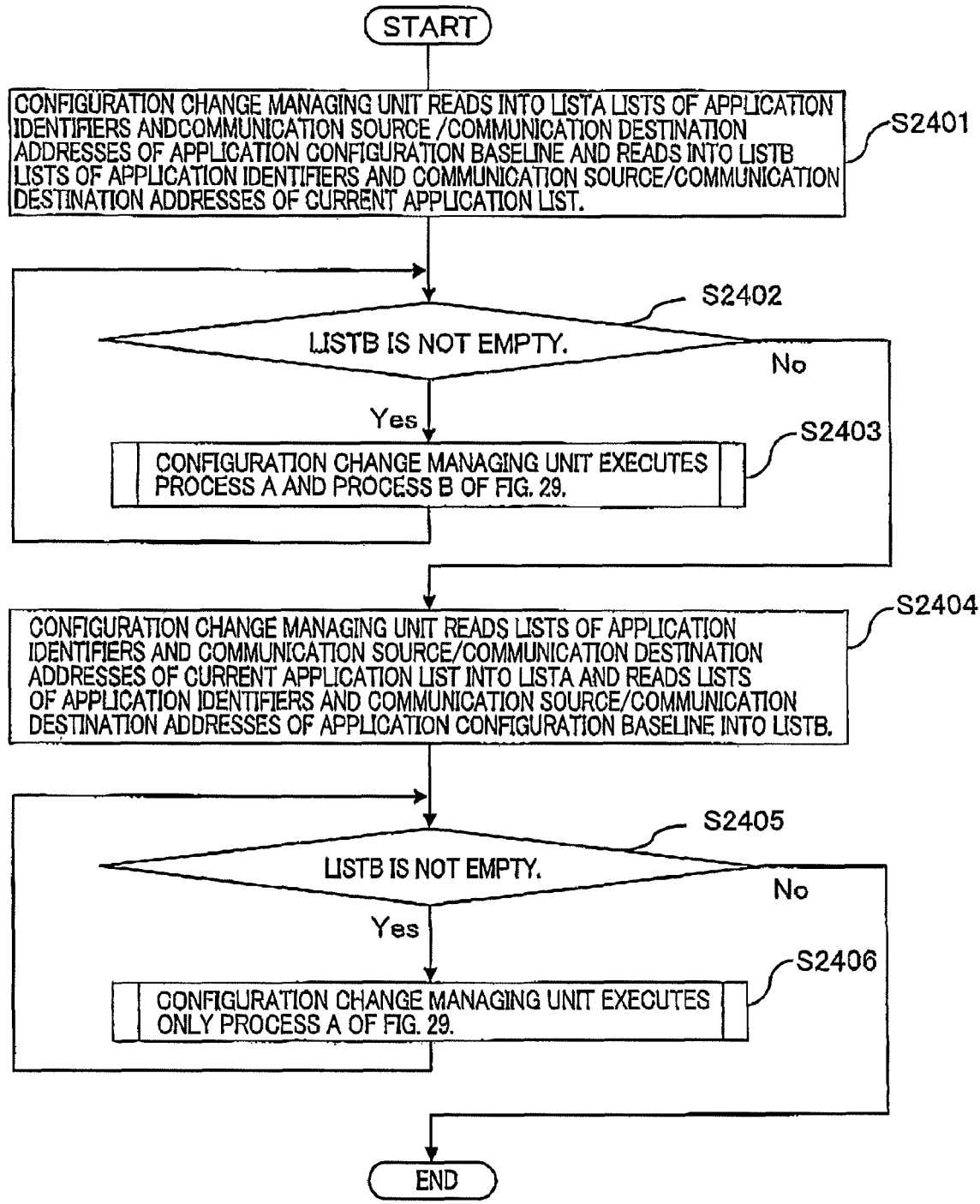
FIG. 28 is an exemplary flowchart of a procedure for specifying changes in the configuration according to the third embodiment.

FIG. 28 depicts a flow of a procedure for: storing into the application configuration change list 900 the result of comparison of the configuration baseline 800 of a given application with the current configuration of each of applications; specifying a group of the application based on the contents stored in the application configuration change list 900; and storing identification information specifying the role of the application into the application role configuration list 400.

The configuration change managing unit 109 reads lists of application identifiers 801 and communication source/communication destination addresses 804 and 805 of the application configuration baseline 800 into ListA generated by the configuration change managing unit 109 and reads lists of the application identifiers 301 and communication source/communication destination addresses 304 and 305 of the current application list 300 into ListB generated by the configuration change managing unit 109 (step 2401). ListA and ListB may be stored in an appropriate memory area of the storage unit 111 for example.

As used herein, the application baseline refers to table-format data describing therein an originally proper application configuration. In the third embodiment, for simplicity of the comparison process, the contents of the baseline are the same as those of the application list 300, but the former may be different from the latter as long as changes in the application configuration can be specified.

The configuration change managing unit 109 judges whether ListB is not empty (step 2402). If ListB is not empty (Yes at step 2402), then the configuration change managing unit 109 executes a process of step 2403, whereas if ListB is empty (No at step 2402), then it executes processes from step 2404 onward.

Figure 29:
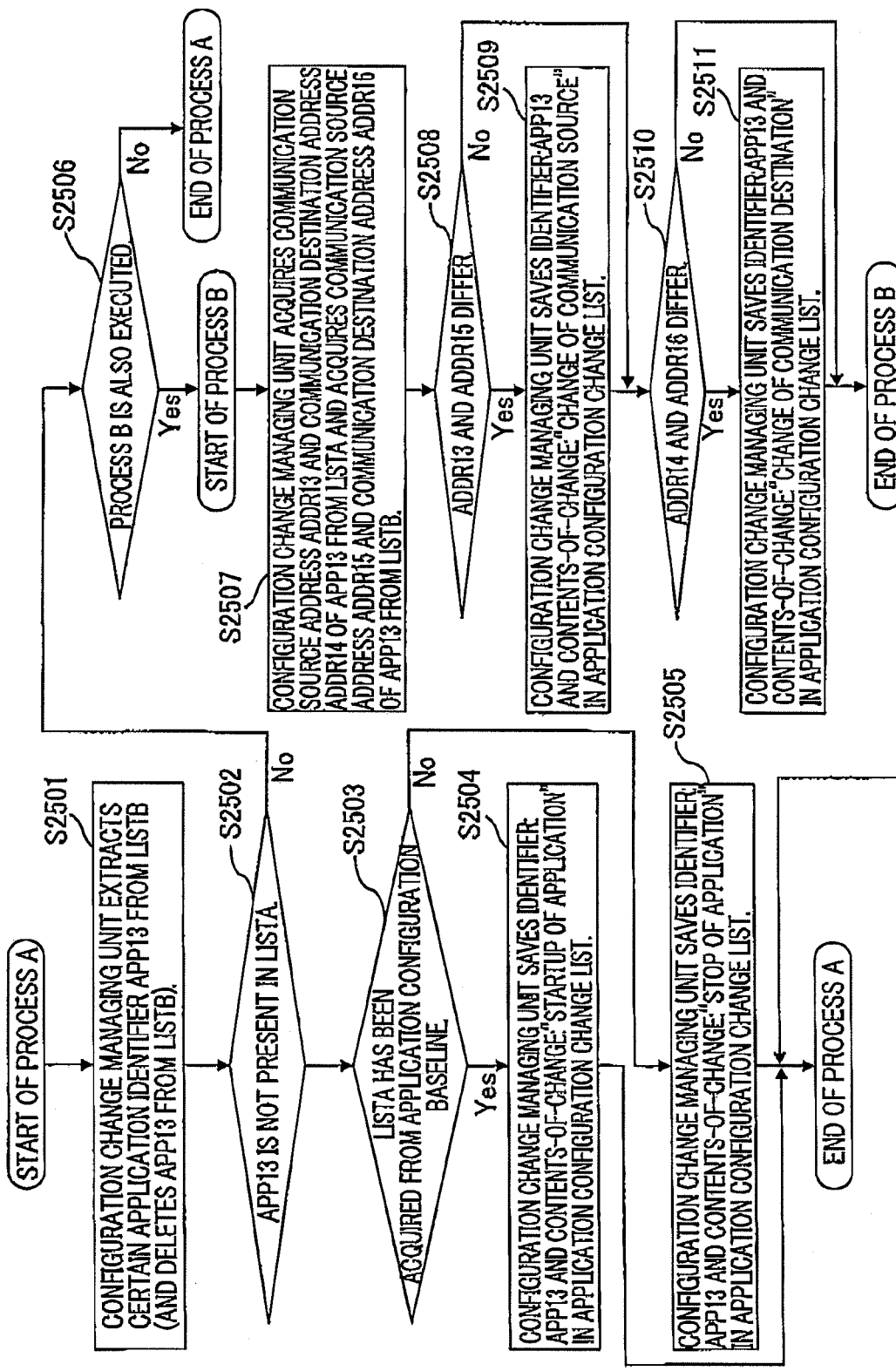
FIG. 29 is an exemplary flowchart of a procedure for specifying changes in the communication status of applications according to the third embodiment.

The configuration change managing unit 109 then executes process A and process B described in FIG. 29 (step 2403).

Referring to FIG. 29, specifically, the configuration change managing unit 109 first extracts an arbitrary application identifier App13 from ListB and deletes App13 from ListB (step 2501).

The configuration change managing unit 109 judges whether App13 is not present in ListA (step 2502). If App13 is not present in ListA (Yes at step 2502), then it executes processes from step 2503 onward, whereas if App13 is present in ListA (No at step 2502), then it executes processes from step 2506 onward.

The configuration change managing unit 109 judges whether information of ListA has been acquired from the application configuration baseline 800 (step 2503). If the information of ListA has been acquired from the application configuration baseline 800 (Yes at step 2503), then it executes a process of step 2504, whereas if the information of ListA has not been acquired from the application baseline list 800 (No at step 2503), then it executes a process of step 2505.

If the information of ListA has been acquired, then the configuration change managing unit 109 saves App13 in the application identifier column 901 of the application configuration change list 900, saves the contents indicating startup of the application in the contents-of-change column 902 (step 2504), and returns to the process of step 2402.

If the information of ListA has not been acquired, then the configuration change managing unit 109 saves App13 in the application identifier column 901 of the application configuration change list 900, saves information indicating stop of the application in the contents-of-change column 902 (step 2505), and returns to the process of step 2402.

The configuration change managing unit 109 judges whether the process B is also to be executed and, since the process B is also to be executed in this process step, executes processes from step 2507 onward (step 2506).

The configuration change managing unit 109 acquires a communication source address Addr13 and a communication destination address Addr14 of App13 from ListA, acquires a communication source address Addr15 and a communication destination address Addr16 of App13 from ListB (step 2507), and returns to the process of step 2402.

The configuration change managing unit 109 judges whether Addr13 differs from Addr15 (step 2508). If different (Yes at step 2508), then it executes processes from step 2509 onward, whereas if not different (No at step 2508), then it executes processes from step 2510 onward.

If Addr13 and Addr15 differ, the configuration change managing unit 109 saves App13 in the application identifier column 901 of the application configuration change list 900, saves information indicative of change of the communication source in the contents-of-change column 902 (step 2509), and proceeds to step 2510.

If Addr13 and Addr15 do not differ, then the configuration change managing unit 109 judges whether Addr14 and Addr16 differ (step 2510). If different (Yes at step 2510), then it executes a process of step 2511, whereas if not different (No at step 2510), then it returns to the process of step 2402.

The configuration change managing unit 109 saves App13 in the application identifier column 901 of the application configuration change list 900, saves information indicative of change of the communication destination in the contents-of-change column 902 (step 2511), and returns to the process of step 2402.

The configuration change managing unit 109 reads lists of the application identifiers 301 and communication source/communication destination addresses 304 and 305 of the current application list 300 into ListA, and reads lists of application identifiers 801 and communication source/communication destination addresses 804 and 805 of the application configuration baseline 800 into ListB (step 2404).

The configuration change managing unit 109 judges whether ListB is not empty (step 2405). If ListB is not empty (Yes at step 2405), then it executes a process of step 2406, whereas if ListB is empty (No at step 2405), then it terminates the procedure.

The configuration change managing unit 109 then executes only the process A described in FIG. 29 (step 2406).

Specifically, the procedure of FIG. 29 is carried out. The configuration change managing unit 109 extracts an arbitrary application identifier App13 from ListB and deletes App13 from ListB (step 2501).

The configuration change managing unit 109 judges whether App13 is not present in ListA (step 2502). If App13 is not present in ListA (Yes at step 2502), then it executes the processes from step 2503 onward, whereas if App13 is present in ListA (No at step 2502), then it executes the processes from step 2506 onward.

The configuration change managing unit 109 judges whether information of ListA has been acquired from the application configuration baseline 800 (step 2503). If the information of ListA has been acquired from the application configuration baseline 800 (Yes at step 2503), then it executes the process of step 2504, whereas if the information of ListA has not been acquired from the application baseline 800 (No at step 2503), then it executes the process of step 2505.

If the information of ListA has been acquired from the application configuration baseline 800, then the configuration change managing unit 109 saves App13 in the application identifier column 901 of the application configuration change list 900, saves the contents indicating startup of the application in the contents-of-change column 902 (step 2504), and returns to the process of step 2405.

If the information of ListA has not been acquired from the application configuration baseline 800, then the configuration change managing unit 109 saves App13 in the application identifier column 901 of the application configuration change list 900, saves information indicating stop of the application in the contents-of-change column 902 (step 2505), and returns to the process of step 2402.

The configuration change managing unit 109 judges whether the process B is also to be executed and, since the process B is not executed in this process step, returns to the process of step 2402 (step 2506).

To summarize, the third embodiment makes use of: the service execution server list 200 storing addresses of servers such as the service execution servers 102 to be managed by the operation management server 100; the application list 300 storing information of applications running on servers to be managed; the application role configuration list 400 storing information roles in a service system of applications stored in the application list 300; the aggregated application list 500 storing information on roles of applications classified by the application aggregating unit; and the aggregated application communication list 600 storing information on role-to-role communications. The third embodiment through use of the above lists includes the following steps of: specifying application roles in the service system from the service execution server list 200 and the application list 300 for storage in the application role configuration list 400; and aggregating applications by roles from the application list 300 and the application role configuration list 400. The third embodiment further includes: comparing the application list 300 with the application configuration baseline 800 describing therein an originally proper application configuration; storing change information derived from the application configuration baseline 800 into the application configuration change list 900; aggregating applications in detail depending on the contents of change from the application configuration change list 900, to update the application role configuration list 400; storing the results of aggregation into the aggregated application list 500 and the aggregated application communication list 600; and creating an application configuration diagram from the aggregated application list 500 and the aggregated application communication list 600.

According to the third embodiment, even when changes occur in the configuration of applications to be managed by the operation management server 100, application configuration diagrams can be created that allow the system administrator to grasp the contents of changes in the configuration at a single glance, by providing aggregated displays of the applications according to the contents of changes.

It is to be noted that the third embodiment may or may not use the service system specifying unit 108, the setting change managing unit 110, the service system list 700, the setting change apply list 1000, the physical/logical(virtual) server list 1200, and the shared application list 1300.

The operation management server 100 of the third embodiment may or may not be provided with the service system specifying unit 108, the setting change managing unit 110, the service system list 700, the setting change apply list 1000, the physical/logical(virtual) server list 1200, and the shared application list 1300.

Fourth Embodiment

A fourth embodiment of the present invention provides a method of relieving the workload on the system administrator arising from changes in setting, by collectively changing the setting information of applications having the same roles or the same names that run on objects such as the service execution servers 102 to be managed by the operation management server 100.

A specific procedure to implement the setting changes includes, in addition to the application aggregating procedure from steps 1401 to 1406 exemplarily depicted in FIG. 15, executing a process of changing setting information of applications which follows. Based on the contents of setting and identifier information specifying roles sent by the system administrator from the input unit 112 of the operation management terminal 101 through the transmitter/receiver unit 114 to the setting change managing unit 110 of the operation management server 100, setting information of applications belonging to the roles is changed.

Figure 30:
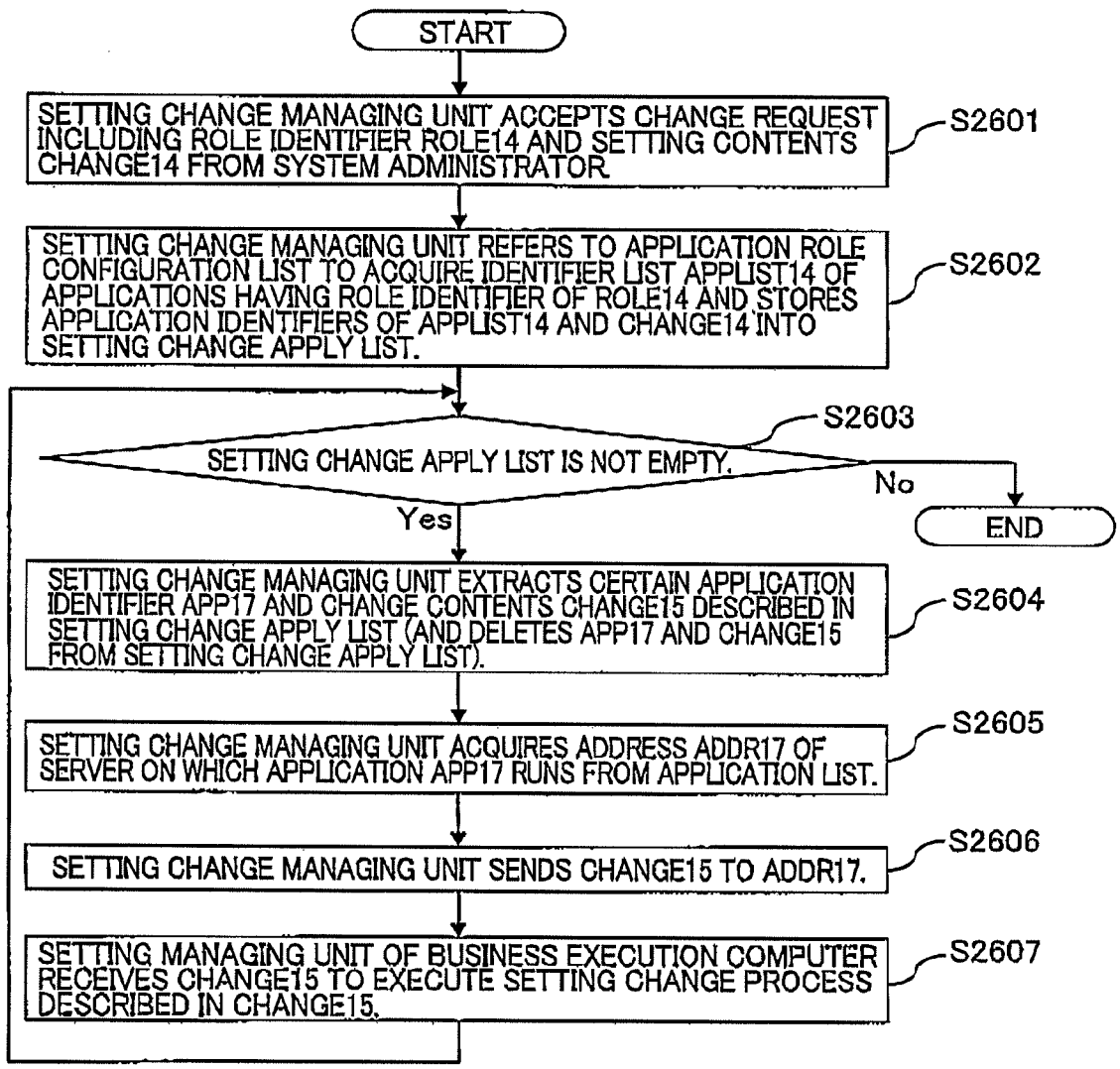
FIG. 30 is an exemplary flowchart of a setting change procedure according to a fourth embodiment of the present invention.

FIG. 30 depicts a flow of a procedure for changing setting information according to the fourth embodiment.

The setting change managing unit 110 accepts a change request including a role identifier Role14 and setting contents Change14 from the system administrator (step 2601).

It is noted that the role identifier Role14 and setting contents Change14 may be the singular form or the plural form. The setting contents Change14 mean data describing therein a process of changing the setting information of applications. The setting contents Change14 designate processes such as "change setting item Y1 of setting file X1 to Z1", "delete setting item Y2 from setting file X2", and "add new setting item Y3 to setting file X3".

The setting change managing unit 110 refers to the application role configuration list 400 to acquire an identifier list AppList14 of applications having the role identifier of Role14, and stores the application identifiers of AppList14 and the setting contents Change14 into the setting change apply list 1000 (step 2602).

The setting change managing unit 110 judges whether the setting change apply list 1000 is not empty (step 2603). If empty (No at step 2603), then it brings the procedure to an end, whereas if not empty (Yes at step 2603), then it executes processes from step 2604 onward.

The setting change managing unit 110 extracts an arbitrary application identifier App17 and change contents Change15 described in the setting change apply list 1000 and deletes App17 and Change15 from the setting change apply list 1000 (step 2604).

The setting change managing unit 110 acquires an address Addr17 of a server on which an application App17 runs from the application list 300 (step 2605).

The setting change managing unit 110 sends Change15 to Addr17 (step 2606). Specifically, the change contents Change15 are sent via the transmitter/receiver unit 114 of the operation management terminal 101 to the transmitter/receiver unit 116 of the service execution server 102 having the address of Addr17.

The transmitter/receiver unit 116 of the service execution server 102 receives Change15 to send the reception contents to the setting managing unit 117, which in turn executes a setting change process described in Change15 (step 2607).

To summarize, the fourth embodiment makes use of: the service execution server list 200 storing therein addresses of servers such as the service execution servers 102 to be managed by the operation management server 100; the application list 300 storing information of applications running on servers to be managed; the application role configuration list 400 storing information roles in a service system of applications stored in the application list 300; the aggregated application list 500 storing information on roles of applications classified by the application aggregating unit; and the aggregated application communication list 600 storing information on role-to-role communications. The fourth embodiment through use of the above lists includes the following steps of: specifying application roles in the service systems from the service execution server list 200 and the application list 300 for storage in the application role configuration list 400; aggregating the applications on a role-by-role basis from the application list 300 and the application role configuration list 400 for storage of the aggregation results into the aggregated application list 500 and the aggregated application communication list 600; creating an application configuration diagram from the aggregated application list 500 and the aggregated application communication list 600; and thereafter acquiring applications whose settings are to be changed and setting contents from the setting change apply list 1000 to apply the changes to the applications.

According to the fourth embodiment, setting information of the applications can collectively be changed according to each of the aggregated roles.

It is to be noted that the fourth embodiment may or may not use the service system specifying unit 108, the configuration change managing unit 109, the service system list 700, the application configuration baseline 800, the application configuration change list 900, the physical/logical(virtual) server list 1200, and the shared application list 1300.

The operation management server 100 of the fourth embodiment may or may not be provided with the service system specifying unit 108, the configuration change managing unit 109, the service system list 700, the application configuration baseline 800, the application configuration change list 900, the physical/logical(virtual) server list 1200, and the shared application list 1300.

Fifth Embodiment

Another method of providing aggregated display in groups each consisting of a plurality of service systems includes additional processes of acquiring a list of files that applications use and specifying service systems to which the applications belong by the list of files. For example, files such as WAR/EAR/JAR files are acquired in accordance with the JSR 77 model that is a standard model on management of the J2EE platform. The files may be acquired by other approaches such as MBean (Managed Bean), SNMP (Simple Network Management Protocol) and CIM (Common Information Mode).

A fifth embodiment of the present invention provides a method of, when an object such as the service execution server 102 to be managed consists of a plurality of service systems, automatically specifying service systems to which applications running on the server belong, and aggregating the applications on the basis of those service systems to create an application configuration diagram.

The fifth embodiment includes executing a process of specifying service systems on which applications run from information of the list of files that the applications use, in addition to the steps 1401 to 1406 (FIG. 15) described in the first embodiment.

Figure 31:
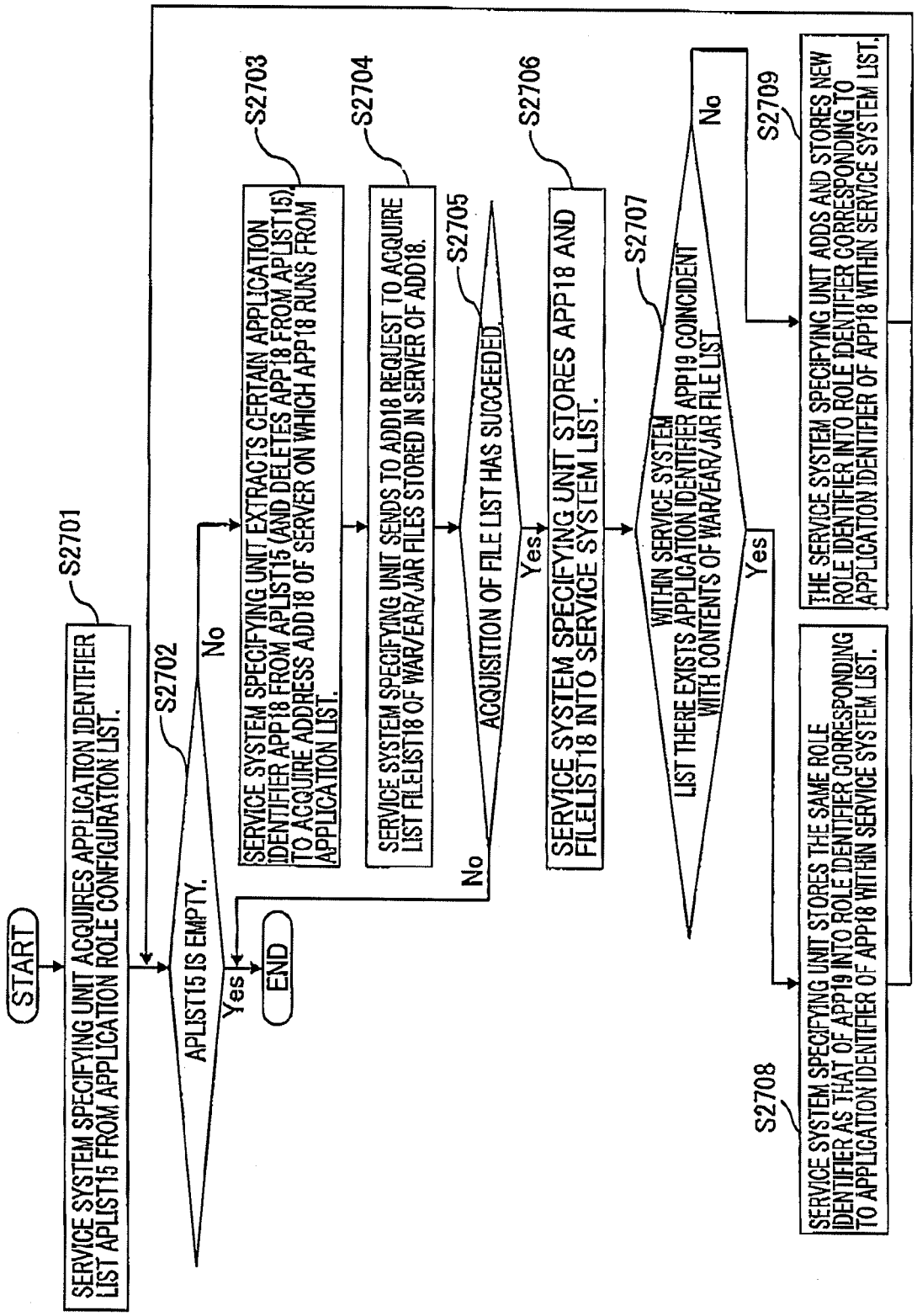
FIG. 31 is an exemplary flowchart of a service system specifying procedure according to a fifth embodiment of the present invention.

FIG. 31 is a flowchart of a procedure for specifying service systems on which applications run according to the fifth embodiment.

The service system specifying unit 108 acquires an application identifier list ApList15 from the application role configuration list 400 (step 2701).

The service system specifying unit 108 judges whether ApList15 is empty (step 2702) and, if ApList15 is empty (Yes at step 2702), terminates the procedure, whereas if ApList15 is not empty (No at step 2702), it executes processes from step 2703 onward.

The service system specifying unit 108 extracts an arbitrary application identifier App18 from ApList15 and deletes App18 from ApList15, to acquire an address18 of a server on which App18 runs from the application list 300 (step 2703).

The service system specifying unit 108 sends to Add18 a request to acquire a list FileList18 of WAR/EAR/JAR files stored in the server of Add18 (step 2704).

The service system specifying unit 108 judges whether the acquisition of the file list has succeeded (step 2705) and performs processes from step 2706 onward only when the acquisition of the file list has succeeded (Yes at step 2705).

The service system specifying unit 108 stores App18 and FileList18 into the service system list (step 2706).

The service system specifying unit 108 judges whether within the service system list there exists an application identifier App19 coincident with the contents of WAR/EAR/JAR file list (step 2707). If App19 is present (Yes at step 2707), then it executes a process of step 2708, whereas if App19 is not present (No at step 2707), then it executes a process of step 2709.

If App19 is present, then the service system specifying unit 108 stores the same role identifier as that of App19 into the role identifier 403 corresponding to the application identifier 401 of App18 within the service system list 700 (step 2708), returning to the process of step 2702.

If App19 is not present, then the service system specifying unit 108 adds and stores a new role identifier into the role identifier 403 corresponding to the application identifier 401 of App18 within the service system list 700 (step 2709), returning to the process of step 2702.

To summarize, the fifth embodiment makes use of: the service execution server list 200 storing therein addresses of servers such as the service execution servers 102 to be managed by the operation management server 100; the application list 300 storing therein information of applications running on servers to be managed; the application role configuration list 400 storing therein information roles in a service system of applications stored in the application list 300; the aggregated application list 500 storing therein information on roles of applications classified by the application aggregating unit; the aggregated application communication list 600 storing therein information on role-to-role communications; and the service system list 700 storing therein service systems to which applications belong. The fifth embodiment through use of the above lists includes the following steps of: specifying application roles in the service systems from the service execution server list 200 and the application list 300 for storage in the application role configuration list 400; acquiring addresses of servers on which applications described in the application list 300 run; attempting communications with the acquired addresses to acquire a list of files that the applications use; specifying applications coincident with the contents of the file list as belonging to the same service system; aggregating the applications on a role-by-role basis from the application list 300 and the application role configuration list 400 in a prejudged service system for storage of the aggregation results into the aggregated application list 500 and the aggregated application communication list 600; and creating an application configuration diagram from the aggregated application list 500 and the aggregated application communication list 600.

According to the fifth embodiment, even when a plurality of service systems mixedly coexist as objects to be managed by the operation management server 100, application configuration diagrams can be created that allow the system administrator to grasp the current configuration at a single glance, by automatically specifying service systems to which applications belong and providing aggregated displays of the applications on the basis of those service systems.

It is to be noted that the fifth embodiment may or may not use the configuration change managing unit 109, the setting change managing unit 110, the application configuration baseline 800, the application configuration change list 900, the setting change apply list 1000, the physical/logical(virtual) server list 1200, and the shared application list 1300.

The operation management server 100 of the fifth embodiment may or may not be provided with the configuration change managing unit 109, the setting change managing unit 110, the application configuration baseline 800, the application configuration change list 900, and the setting change apply list 1000.

Sixth Embodiment

While in the first embodiment the roles are specified using only the communication source addresses 304 and the names 303 of applications, more detailed role classification would be feasible by specifying the roles while taking into consideration the communication destination addresses 305 of the applications as well.

A sixth embodiment of the present invention provides a method of, when there exist a plurality of applications running on the service execution server 102 and having different roles and just the same name 303 and communication source address 304, acquiring communication destination addresses 305 of the applications running on the server, specifying the roles of the applications by the communication destination addresses 305, and aggregating the applications on a role-by-role basis, to thereby create an application configuration diagram.

The sixth embodiment includes executing a process of specifying roles of the applications from the communication destination addresses 305 of the applications, in addition to the steps 1401 to 1406 (FIG. 15) described in the first embodiment.

Figure 32:
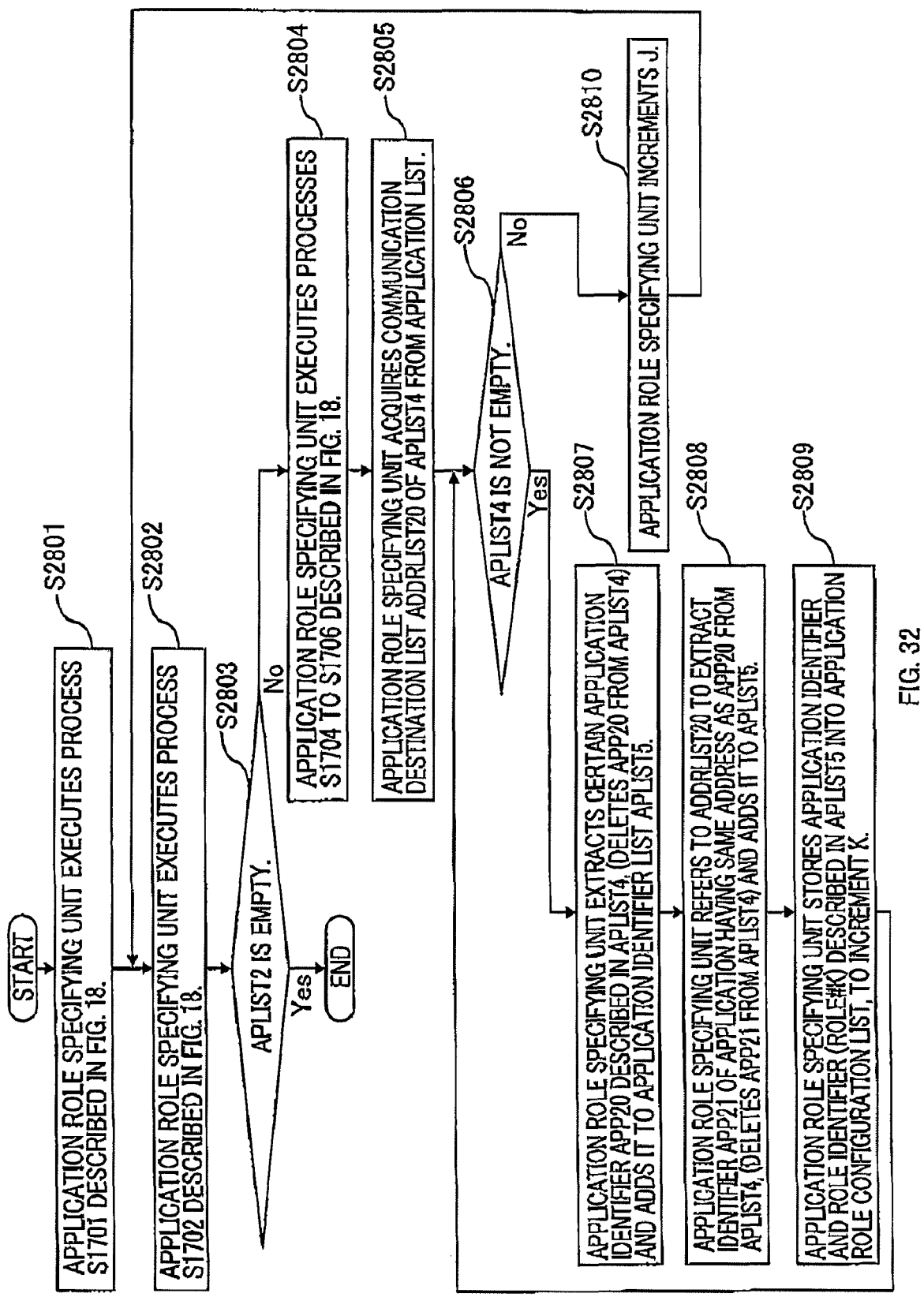
FIG. 32 is an exemplary flowchart of a procedure for specifying roles of applications according to a sixth embodiment of the present invention.

FIG. 32 is a flowchart of a procedure for specifying the roles of applications according to the sixth embodiment.

The application role specifying unit 105 executes the process (the current layer number j=1) of step 1701 described in FIG. 18 (step 2801).

The application role specifying unit 105 executes the process of step 1702 (acquiring an application identifier list ApList3 of applications having layer #j as layer identifiers described in the application role configuration list, with the current layer number j=1) described in FIG. 18 (step 2802).

The application role specifying unit 105 judges whether ApList2 is empty (step 2803) and, if ApList2 is empty (Yes at step 2803), terminates the procedure, whereas if ApList2 is not empty (No at step 2803), it executes a process of step 2804.

The application role specifying unit 105 executes the processes from steps 1704 to 1706 described in FIG. 18 (step 2804).

The application role specifying unit 105 acquires a communication destination list AddrList20 of ApList4 from the application list 300 (step 2805).

The application role specifying unit 105 judges whether ApList4 is not empty (step 2806) and, if ApList4 is empty (No at step 2806), executes a process of step 2810, whereas if ApList4 is not empty (Yes at step 2806), it executes processes from step 2807 onward.

The application role specifying unit 105 extracts an arbitrary application identifier App20 described in ApList4, deletes App20 from ApList4, and adds it to the application identifier list ApList5 (step 2807).

The application role specifying unit 105 refers to AddrList20 to extract an identifier App21 of an application having the same address as that of App20 from ApList4, deletes App21 from ApList4, and adds it to ApList5 (step 2808).

The application role specifying unit 105 stores the application identifier 401 and the role identifier 403 (role #k) described in ApList5 into the application role configuration list 400, to increment k (step 2809).

The application role specifying unit 105 increments j (step 2810), returning to the step 2802.

To summarize, the sixth embodiments makes use of: the service execution server list 200 storing addresses of servers such as the service execution servers 102 to be managed by the operation management server 100; the application list 300 storing information of applications running on servers to be managed; the application role configuration list 400 storing information roles in a service system of applications stored in the application list 300; the aggregated application list 500 storing information on roles of applications classified by the application aggregating unit; and the aggregated application communication list 600 storing information on role-to-role communications. The sixth embodiment includes the following steps of: specifying application roles in the service systems from the service execution server list 200 and the application list 300 for storage in the application role configuration list 400; acquiring communication destinations of applications described in the application list 300; specifying applications having the same communication destination and belonging to the same layer to be of the same role; aggregating the applications on a role-by-role basis from the application list 300 and the application role configuration list 400; storing the results of aggregation into the aggregated application list and the aggregated application communication list 600; and creating an application configuration diagram from the aggregated application list 500 and the aggregated application communication list 600.

According to the sixth embodiment, even when there exist applications having the same communication source address and the same name but having different roles, more detailed application configuration diagrams can be created by automatically specifying the above applications as being of different roles as long as they have different communication destination addresses, and providing aggregated displays of the applications on a role-by-role basis.

It is to be noted that the sixth embodiment may or may not use the service system specifying unit 108, the configuration change managing unit 109, the setting change managing unit 110, the service system list 700, the application configuration baseline 800, the application configuration change list 900, the setting change apply list 1000, the physical/logical(virtual) server list 1200, and the shared application list 1300.

The operation management server 100 of the sixth embodiment may or may not be provided with the service system specifying unit 108, the configuration change managing unit 109, the setting change managing unit 110, the service system list 700, the application configuration baseline 800, the application configuration change list 900, the setting change apply list 1000, the physical/logical(virtual) server list 1200, and the shared application list 1300.

Although the present invention has been described in detail hereinabove based on the embodiments thereof referring to the accompanying drawings, the present invention is not to be construed as being limited to the above embodiments. It is also to be understood that any variants and equivalents fall under the scope of the present invention without departing from the spirit of the present invention.

What is claimed is:

1. An information processing apparatus communicatively coupled via a network to servers on which a plurality of applications are running for operating a service system, the information processing apparatus comprising:

a storage unit that stores network addresses of the servers, storing, in a correlated manner, application identification information as information for identifying the applications, active server addresses as network addresses of the servers on which the applications are running, and communication source addresses of the applications; and an application aggregating unit acquiring from the storage unit and comparing the application identification information, the addresses of the servers corresponding thereto, and communication source addresses of the applications, so that when it is judged that the communication source addresses do not coincide with any of the addresses of the servers, the application aggregating unit judges the applications having the application identification information as being applications belonging to a first layer in the service system, acquiring from the storage unit and comparing application identification information of the applications judged as belonging to the first layer, the active server addresses of the applications, and the application identification information and the communication source addresses of applications other than the applications judged as belonging to the first layer, so that the application aggregating unit judges applications having the application identification information correlated to the communication source addresses identical to the active server addresses as belonging to a second layer;

continuing acquiring from the storage unit communication source addresses of applications other than the applications judged as belonging to the first and the second layer, to repeat the judgment process to judge the layers of each applications contained in the service system;

aggregating each layer of the applications contained in the service system to roles of the applications, such that each application is classified by corresponding names of the applications for each of the application layers, and identifying a role identification to each of the roles of the applications; and specifying the communication between the roles of the applications, and storing the combination of the source role identification and a destination role identification into an aggregated application communication list in the storage unit.

2. The information processing apparatus of claim 1, wherein the information processing apparatus generates and displays a configuration diagram representing a correlation status among the applications based on the combination of the source role identification and the destination role identification stored in the aggregated application communication list.

3. The information processing apparatus of claim 2, wherein the configuration diagram of the applications represents the number of applications contained in the layer for each of the judged layers.

4. A method of operating an information processing apparatus communicatively coupled to servers on which a plurality of applications are running for operating a service system, the apparatus having a storage unit that stores network addresses of the servers, wherein storing, in a correlated manner, application identification information as information for identifying the applications, active server addresses as network of the servers on which the applications are running, and communication source addresses of the applications, the method comprising:

acquiring from the storage unit and comparing the application identification information, the addresses of the servers corresponding thereto, and communication source addresses of the applications, so that when it is judged that the communication source addresses do not coincide with any of the addresses of the servers, the applications having the application identification information are judged as being applications belonging to a first layer in the service system;

acquiring from the storage unit and comparing application identification information of the applications judged as belonging to the first layer, the active server addresses of the applications, and application identification information and communication source addresses of applications other than the applications judged as belonging to the first layer, so that applications having the application identification information correlated to the communication source addresses identical to the active server addresses are judged as belonging to a second layer;

continuing acquiring from the storage unit communication source addresses of applications other than the applications judged as belonging to the first and the second layer, to repeat the judgment process to judge the layers of each applications contained in the service system; and aggregating each layer of the applications contained in the service system to roles of the applications, such that each application is classified by corresponding names of the applications for each of the application layers, and identifying a role identification to each of the roles of the applications; and specifying the communication between the roles of the applications, and storing the combination of the source role identification and a destination role identification into an aggregated application communication list in the storage unit.

* * * * *